US012732272B2

(12) United States Patent
Hariq et al.

(10) Patent No.: US 12,732,272 B2
(45) Date of Patent: Sep. 8, 2026

(54) RELAY-ASSISTED HIGH-CAPACITY SATELLITE FEEDER LINKS WITH INTEGRATED LINE-OF-SIGHT MIMO RF AND OPTICAL CHANNELS VIA HAPS

(71) Applicant: Hughes Network Systems, LLC, Germantown, MD (US)

(72) Inventors: Sayed Hasan Hariq, Germantown, MD (US); Rohit Iyer Seshadri, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 331 days.

(21) Appl. No.: 18/507,780

(22) Filed: Nov. 13, 2023

(65) Prior Publication Data

US 2025/0158711 A1 May 15, 2025

(51) Int. Cl.
*H04B 10/118* (2013.01)
*H04B 7/185* (2006.01)

(52) U.S. Cl.
CPC ....... *H04B 10/118* (2013.01); *H04B 7/18504* (2013.01)

(58) Field of Classification Search
CPC .......................... H04B 7/18504; H04B 10/118
See application file for complete search history.

(56) References Cited

U.S. PATENT DOCUMENTS

2012/0068880 A1* 3/2012 Kullstam ........... H04B 7/18504 342/81
2017/0214462 A1* 7/2017 Busche .............. H04B 7/18513
2019/0173569 A1* 6/2019 Liu ...................... H04B 7/1851
2020/0119811 A1* 4/2020 Kay ..................... H04B 10/118
2021/0367668 A1* 11/2021 Hand .................. H04J 14/0298
2023/0092301 A1* 3/2023 Burr ................... H04B 10/1129 398/115

OTHER PUBLICATIONS

Kremenetskaya, et al., "Optical-Radio Hybrid Technology in Multilayer Non-Terrestrial Telecommunications", Institute of Electrical and Electronics Engineers International Conference on Information and Telecommunication Technologies and Radio Electronics (UkrMiCo), Nov. 29, 2021, pp. 1-6.
Ray, "A Review on 6G for Space-Air-Ground Integrated Network: Key Enablers, Open Challenges, and Future Direction", King Saud University Journal. Computer and Information Sciences, vol. 34, No. 9, Oct. 2022, pp. 6949-6976.
PCT/US2024/055202, "International Search Report and Written Opinion", Feb. 6, 2025, 14 pages.

* cited by examiner

*Primary Examiner* — Nathan M Cors
(74) *Attorney, Agent, or Firm* — Kilpatrick Townsend & Stockton LLP

(57) ABSTRACT

Techniques are described for providing satellite communications via a relay-assisted hybrid radio frequency/free-space-optical (RF/FSO) ground-satellite link. A high-altitude platform station (HAPS) splits the ground-to-satellite link into a ground-to-HAPS line-of-sight (LoS) multiple-in-multiple-out (MIMO) radio frequency (RF) link, and a HAPS-to-satellite FSO link. The approach mitigates the effects of atmospheric impairments on the FSO link, while also appreciably reducing adverse effects of bandwidth and propagation disparity between the RF and FSO links.

18 Claims, 11 Drawing Sheets

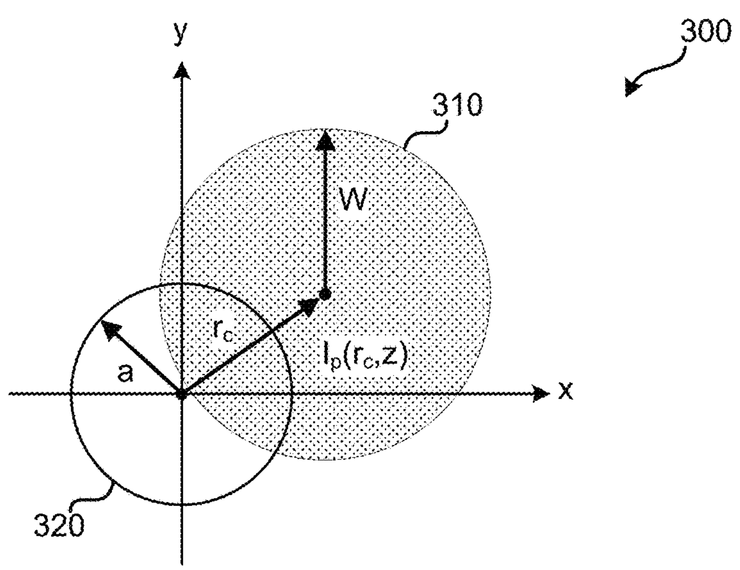
FIG. 3
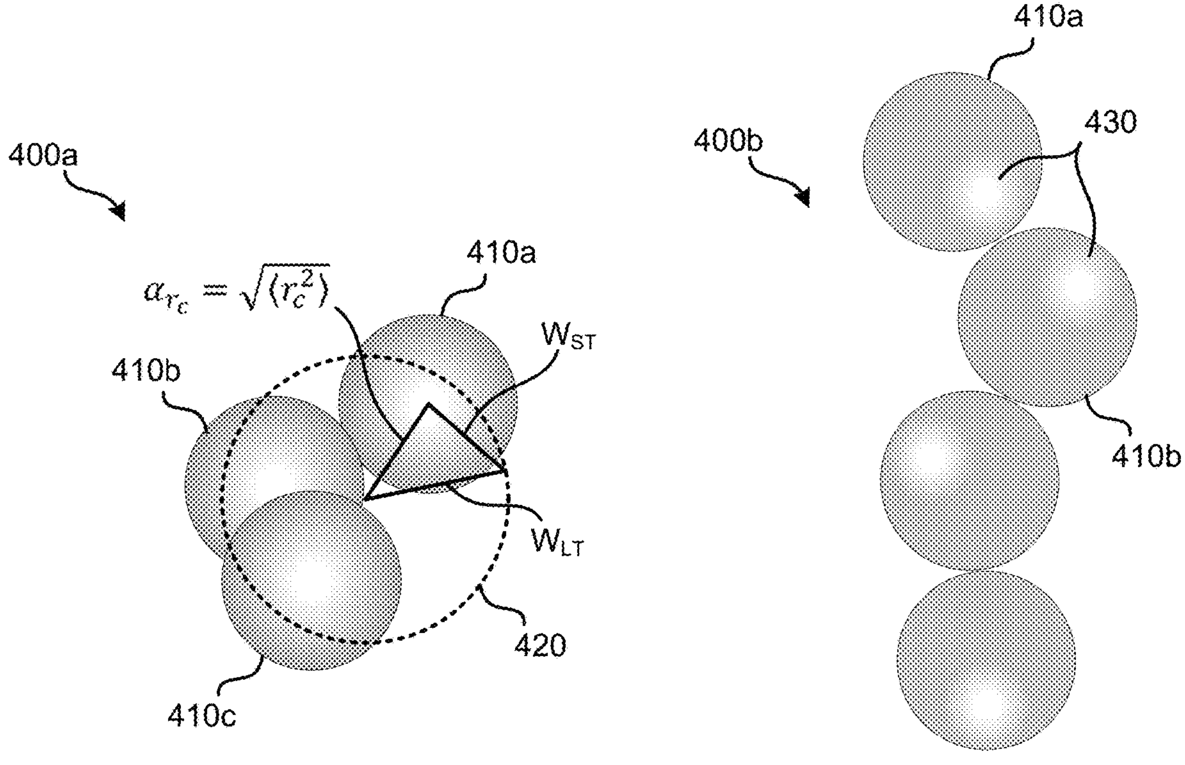
FIG. 4A
FIG. 4B

800a

800b

1000

Maximum Capacity

90% Capacity

SISO Link Capacity

28

26.63

23.97

22

20

18

16

14

12

10

8

6.66

6

Capacity [bps/Hz]

0

2

4

5.7

7.1

7.9

10

12

14

16

18

20

Antenna Spacing, $d_{G,A} = d_{H,A}$ [m]

RELAY-ASSISTED HIGH-CAPACITY SATELLITE FEEDER LINKS WITH INTEGRATED LINE-OF-SIGHT MIMO RF AND OPTICAL CHANNELS VIA HAPS

BACKGROUND

Satellite communications are generally in several radio frequency (RF) bands. However, those RF bands have become increasingly congested and costly, particularly as the most suitable frequency bands have been licensed. Free-space-optical (FSO) communications refers to line-of-sight (LOS) communications using an optical carrier to convey information between two fixed points in the outdoor environment. FSO communications are typically infrared (IR) band communications, such as using IR lasers, not in the RF bands generally used by satellite communications. FSO communications can potentially provide certain features as compared to RF communications, due, for example, to appreciable amounts of unlicensed spectrum, very narrow beams, low power consumption, inexpensive installation cost with faster deployment, etc. With recent advancements in space technology and sophisticated optical sources and detectors, there has been an interest in exploring the use of FSO links in satellite communication contexts, potentially offering appreciably larger data rates (e.g., up to terabits per second).

The performance of a ground-to-satellite FSO link is mainly affected by atmospheric channel impairments, such as atmospheric attenuation, scintillation, beam wandering, and pointing errors. These types of channel impairments produce frequent link failures. For example, the interaction between the photons of the optical beam and the molecular constituent of the atmosphere, as well as the existence of fog and clouds in the atmosphere, can cause very large signal attenuations. Inhomogeneities in the atmospheric temperature from point to point can cause atmospheric turbulence, which can result in random fluctuation of the atmospheric refractive index along the path of the optical signal traversing the atmosphere, resulting in scintillation, beam wander, and wave-front or phase distortion. Scintillation and beam wander can result in random fluctuations of the received beam intensity and degradation of system performance. Pointing error can result from lack of perfect alignment between the transmitter and the receiver, which can result in power penalties and can be made worse by beam wander. These and other practical constraints have frustrated conventional attempts at implementing reliable ground-to-satellite FSO links.

Another factor that has frustrated conventional attempts is that FSO links need an unobstructed line-of-sight to the satellite, which is not possible for ground-to-satellite links due at least to clouds. Typical low-altitude clouds can attenuate an optical signal by more than 60 decibels (dB); hence, link outages due to low-altitude clouds remain a primary impediment to adopting a purely optical satellite feeder-link. One conventional work-around to cloud-based attenuation is to have multiple redundant optical gateways spread over a large geographical region, so that at least one location has clear sky conditions at any given time. Such an approach tends to be prohibitively expensive for practical deployments. Another solution involves using an RF link as a back-up in case the optical link has an outage. However, because the RF link has a much lower bandwidth than the FSO link, such an approach tends to entail a substantial reduction in feeder-link capacity.

SUMMARY

Embodiments described herein include systems and methods for providing a relay-assisted hybrid radio frequency/free-space-optical (RF/FSO) ground-satellite link. A high-altitude platform station (HAPS) splits the ground-to-satellite link into a ground-to-HAPS line-of-sight (LoS) multiple-in-multiple-out (MIMO) radio frequency (RF) link, and a HAPS-to-satellite FSO link. The approach mitigates the effects of atmospheric impairments on the FSO link, while also appreciably reducing adverse effects of bandwidth and propagation disparity between the RF and FSO links.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

FIG. 3 shows an illustrative representation of a circular detection aperture and a Gaussian beam profile at a receiver, with misalignment in the receiver plane.

FIG. 4A shows an illustrative representation of the random movement of a beam centroid in a receiver plane due to beam wander.

FIG. 4B shows an illustrative representation of the random movement of a beam hot-spot around a beam centroid due to beam wander.

DETAILED DESCRIPTION

Figure 1:
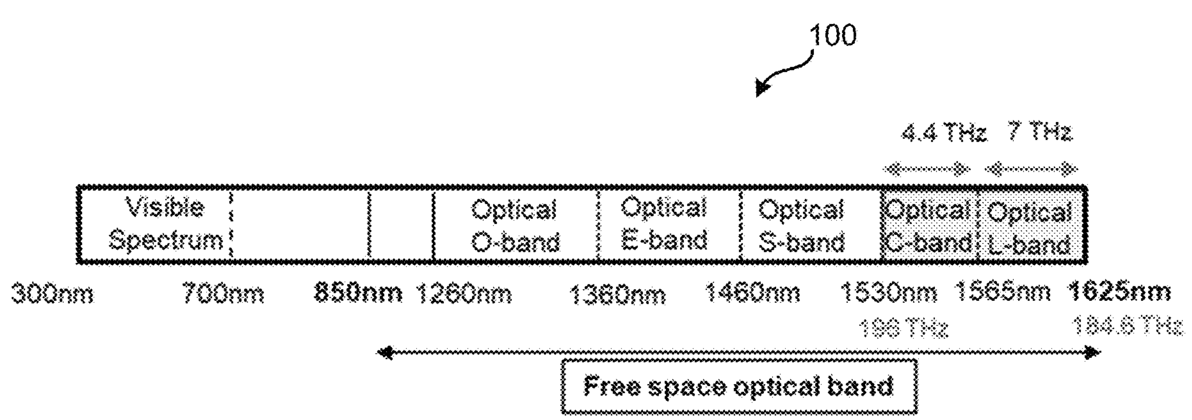
FIG. 1 shows a relevant portion of the radio frequency spectrum that includes the free space optical (FSO) band.

Embodiments described herein seek to implement reliable ground-to-satellite free-space-optical (FSO) links. Continually increasing demand for faster satellite broadband has continued to exacerbate congestion in the radio frequency (RF) spectrum, especially in the feeder link (i.e., the link between the gateway and the satellite). Transitioning to higher frequency bands, such as those used by FSO communication links, can help alleviate such feeder-link congestion concerns. For example, FIG. 1 shows a relevant portion of the radio frequency spectrum that includes the free space optical (FSO) band. One feature of this band is that it includes approximately 11 Terahertz of unlicensed spectrum in the "optical C band" and "optical L band." Another feature is that beams in the FSO band can be very narrow, thereby providing more power concentrated at the receiver, a more secure link with less interference, and reductions in size, weight, and power for various components.

However, conventional attempts have tended to be unsuccessful. Implementing an FSO link directly between a ground station and a satellite involves sending an optical signal over a very large distance (e.g., up to around 1,000 kilometers for a low-Earth orbit (LEO) satellite, and up to tens of thousands of kilometers for a geosynchronous (GEO) satellite), including passing the signal through tens of kilometers of atmosphere. As detailed below, adverse atmospheric effects over such distances have tended to frustrate attempts to implement reliable ground-to-satellite free-space-optical (FSO) links.

One such effect is atmospheric attenuation and path loss. For example, the molecular and gaseous structure of the atmosphere and its interaction with photons of a propagated FSO beam can cause appreciably large optical signal attenuation, even in clear weather conditions. The presence of fog and clouds causes further signal attenuation and even signal blockage. Other adverse atmospheric effects include beam scintillation and beam wander. Inhomogeneities in the temperature of the atmosphere can cause fluctuations in the refractive index of the atmosphere from point to point, referred to as optical turbulence, and can produce eddies of different temperatures that act like refractive prisms of different sizes and indices of refraction. Interactions between the FSO links (e.g., an IR laser beam) and the turbulent medium, in particular with the small-scale eddies in the order of or smaller than the beam size, can produce random phase and amplitude variations of the information-bearing optical beam, known as beam scintillation, which can result in fading of the received optical power. Interactions between the FSO link and larger scale eddies (larger than the beam size) can cause random displacement of the instantaneous center of the beam in the receiver plane, known as beam wander, which can result in beam wander-induced pointing error.

In addition to atmospheric effects, additional power penalties can arise from imperfect alignment between the Earth transmitter and the receiving satellite. For example, even a very small pointing error can result in an appreciable receiver-transmitter misalignment when the transmitter and receiver are separated by thousands of kilometers. The various real-world impairments described above have all frustrated conventional attempts at implementing a reliable ground-to-satellite FSO link.

Figure 2:
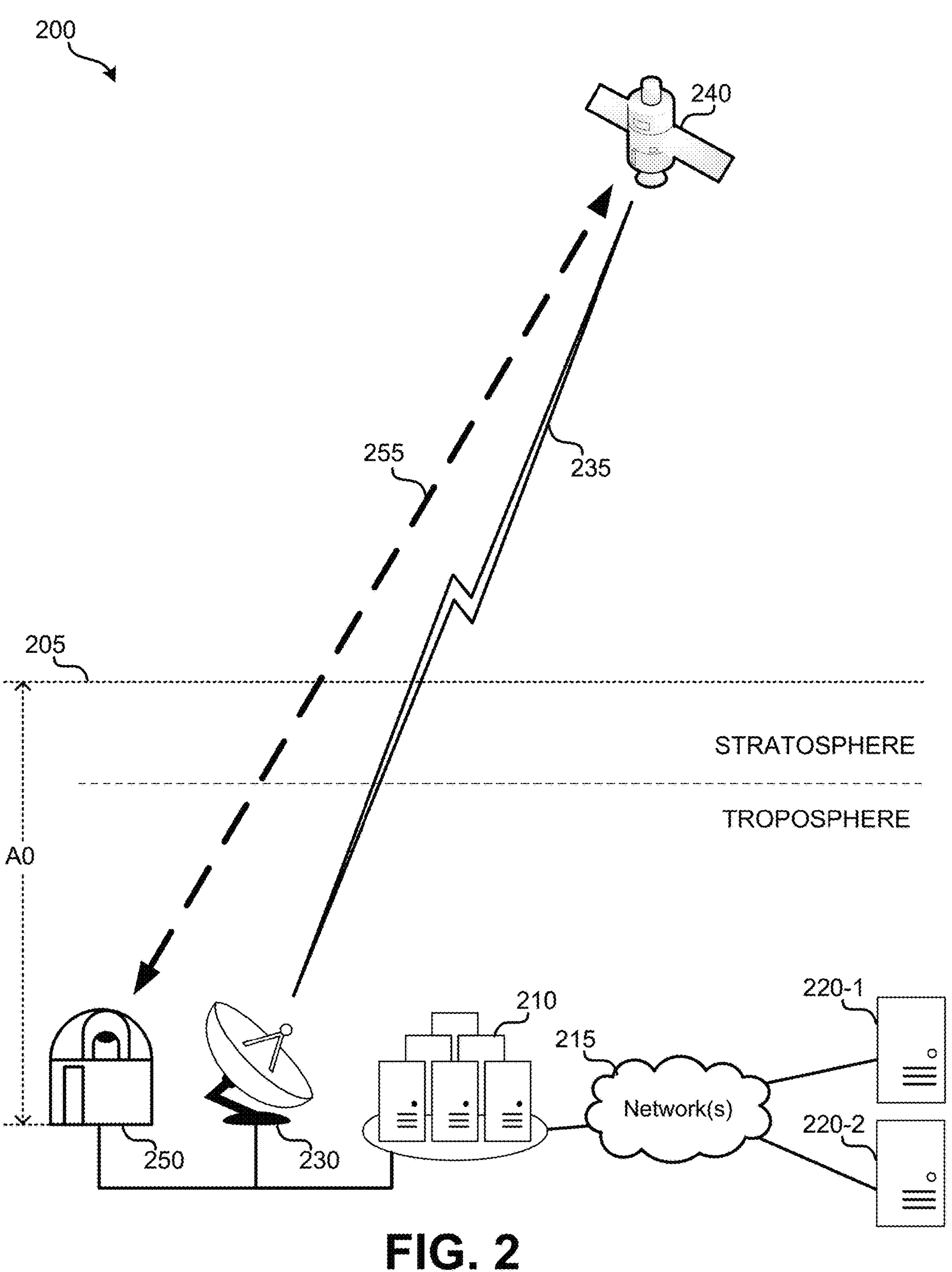
FIG. 2 shows an example of a conventional communication environment in which ground equipment is in communication with a communication satellite via one or more communication links.

For context, FIG. 2 shows an example of a conventional communication environment 200 in which ground equipment is in communication with a communication satellite 240 via one or more communication links. The communication environment 200 can include a gateway system 210, network(s) 215, data systems 220 (e.g., 220-1, 220-2), gateway satellite antenna 230, optical ground station 250, and satellite 240. The gateway system 210 can be an implementation of a ground Earth station (GES) teleport gateway. Gateway system 210 may serve as a bridge or gateway between a satellite communication network and one or more networks 215. For example, the network(s) 215 can include the Internet, and/or any other communication networks that are public and/or private, wired and/or wireless, etc. The network(s) 215 can also be in communication with computational data systems 220, such as Internet-accessible server systems. For example, the gateway system 210 can communicate with the Internet and one or more of various other public or private networks.

Gateway system 210 may use one or more satellite antennas, such as gateway satellite antenna 230, to communicate with satellite 240 via gateway-satellite radio frequency (RF) communication links 235. The same or separate antennas may be used to receive data from satellite 240 and transmit data to satellite 240 via the gateway-satellite RF communication links 235. For example, the gateway satellite antenna 230 is used by the gateway system 210 to send forward-channel data via uplink portions of gateway-satellite RF communication links 235 and/or to receive return-channel data via downlink portions of gateway-satellite RF communication links 235.

As illustrated, alternative and or additional communications can be between the optical ground station 250 and the satellite 240 via one or more gateway-satellite free space optical (FSO) communication links 255. The Earth's atmosphere is typically considered as having layers. For example, between the ground and the edge of outer space, the Earth's atmosphere can be considered as including the troposphere, stratosphere, mesosphere, thermosphere, and exosphere. FIG. 2 shows only an illustrative boundary between the troposphere and stratosphere. Although the layers do not have precise boundaries, the troposphere can generally be considered as occupying approximately the first 10 kilometers of atmosphere, and the stratosphere can be considered as occupying the next 40 kilometers of atmosphere (i.e., from approximately 10-50 kilometers in altitude from the ground level).

As noted above, certain atmospheric effects (e.g., atmospheric attenuation and path loss, beam scintillation, beam wandering, etc.) can tend to interfere with FSO communications. Prior experimentation has demonstrated that these interfering atmospheric effects tend to be dominant at altitudes below an atmospheric effect boundary ("A0") 205. For example, A0 205 is typically at altitudes around 20 kilometers from the ground, which can be in the lower stratosphere close to the ozone layer. Such interfering atmospheric effects tend to be relatively negligible above A0 205. While described as a "boundary," there is no sharp change in atmospheric effects that can be observed at a particular altitude. Rather, statistical changes in atmospheric effects tend to change gradually over a range of altitudes around A0 205, such that A0 205 provides a convenient reference for comparing altitudes well below A0 205, altitudes around A0 205, and altitudes well above A0 205.

For the sake of illustration, an optical ground station 250 can be considered as communicating with the satellite 240 using intensity modulation based on-off keying (OOK) at the transmitter, and direct detection with PIN photodetectors at the receiver ("PIN" refers to an intrinsic, 'i', region between p-doped and n-doped regions). With such an illustrative configuration, the received signal via the FSO communication link 255 at the satellite 240 can be given as:

$$r_{SAT} = P_T R I s + n \tag{Eq. 1}$$

where $P_T$ is the transmitted optical power; R is the responsivity of the photodetector; I is the channel coefficient; $s \in \{0,1\}$ is the transmitted information bit; and n is the additive white Gaussian noise with zero mean and variance $$\sigma_n^2,$$

which represents the thermal noise at the photodetector and is a dominant noise term in a PIN photodetector. The channel coefficient models all channel impairments including the atmospheric attenuation ($I_l$) due to varying weather conditions (e.g., fog, clouds, etc.), the atmospheric turbulence ($I_a$), and the pointing error due to misalignment between transmitter and receiver ($I_p$), and can be given as ($I = I_l \times I_a \times I_p$). It should be noted that $I_l$ is a deterministic channel coefficient and $I_a$ and $I_p$ are randomly varying channel coefficients.

As noted above, one interfering atmospheric effect that tends to be dominant up to around A0 205 is atmospheric attenuation between the optical ground station 250 and the satellite 240. Such atmospheric attenuation can be given using the so-called Beer-Lambert law as follows:

$$I_{l,G-S} = e^{-\sigma \cdot z_{G-S}} \tag{Eq. 2}$$

where σ is the attenuation coefficient, and $z_{G-S}$ is the propagation distance between ground station and the satellite. In the approach used to model the atmospheric attenuation, weather effects are characterized in terms of visibility.

For different weather conditions, σ can be calculated using the so-called Kim model as follows:

$$\sigma = \frac{3.91}{V(\text{km})}\left(\frac{\lambda(\text{nm})}{550}\right)^{-\delta} \tag{Eq. 3}$$

where V is the visibility in km, λ is the beam wavelength in nm, and δ is the particle size related coefficient given by the following:

$$\delta = \begin{cases} 1.6 & V \geq 50 \text{ km} \\ 1.3 & 6 \text{ km} \leq V < 50 \text{ km} \\ 0.16V + 0.34 & 1 \text{ km} \leq V < 6 \text{ km} \\ V - 0.5 & 0.5 \text{ km} \leq V < 1 \text{ km} \\ 0 & V < 0.5 \text{ km} \end{cases} \tag{Eq. 4}$$

Another interfering atmospheric effect that tends to be dominant up to around A0 205 is atmospheric turbulence-induced beam scintillation and beam wander. Typically, the weak fluctuation theory of turbulence can be sufficient to study the effect of turbulence for a ground-to-satellite FSO link 255. In the weak fluctuation regime, in the absence of beam wander effect, the received irradiance statistics of an optical wave tend to be governed by a log-normal probability distribution function (PDF) model, given by the following:

$$f_{I_a}(I_a) = \frac{1}{2I_a\sqrt{2\pi\sigma_\chi^2}}\exp\left(-\frac{(\ln(I_a) - 2\mu_\chi)^2}{8\sigma_\chi^2}\right) \tag{Eq. 5}$$

where $\mu_\chi$ and $$\sigma_\chi^2$$

denote the log-amplitude mean and variance of the optical intensity, respectively.

The log-amplitude mean and variance of the optical beam can be given in terms of the so-called Rytov variance, or scintillation index, as follows:

$$\sigma_\chi^2 = \frac{\sigma_R^2}{4} = \frac{1}{4}\ln(\sigma_I^2 + 1) \qquad \mu_\chi = -\sigma_\chi^2 \tag{Eq. 6}$$

where $$\sigma_R^2$$

is the Rytov variance and $$\sigma_I^2$$

is the scintillation index.

In the absence of beam wander effect, such as in the case of a downlink FSO channel, the scintillation index can be given by the following:

$$\sigma_I^2 \approx \sigma_R^2 = 2.25k^{7/6}\sec^{11/6}(\theta_{z_{G-S}})\int_{h_0}^{H_{SAT}} C_n^2(h)(h - h_0)^{5/6}dh \tag{Eq. 7}$$

where $k = 2\pi/\lambda$ is the optical wave number, $\theta_{z_{G-S}}$ is the zenith angle between ground station and satellite, $h_0$ is the ground station altitude from the sea level, $H_{SAT}$ is the altitude of the satellite, and $$C_n^2(h)$$

is the refractive index structure parameter of the atmosphere which is a function of altitude for a slant path.

To describe variations in the structure parameter as a function of altitude, it is customary to use a $$C_n^2(h)$$

profile model. A widely used model is the so-called Hufnagel-Valley (H-V) model, which can be described as follows:

$$C_n^2(h) = 0.00594\left(\frac{w}{27}\right)^2(10^{-5}h)^{10}\exp\left(-\frac{h}{1000}\right) + 2.7\times10^{-16}\exp\left(-\frac{h}{1500}\right) + C_n^2(0)\exp\left(-\frac{h}{100}\right) \quad \text{(Eq. 8)}$$

where w is the RMS wind speed and $$C_n^2(0)$$

is the ground level refractive index structure parameter.

As noted above, in addition to atmospheric effects, pointing errors due to misalignment can appreciably degrade the quality and/or efficacy of FSO communications over such a long ground-satellite FSO communication link 255. Because FSO communications are line-of-sight communications, pointing accuracy can have a significant effect in determining the link performance and reliability. Misalignment between the transmitter (e.g., optical ground station 250) and receiver (e.g., satellite 240) can cause pointing errors and signal fading at the receiver (e.g., at satellite 240).

To investigate pointing error due to misalignment, as well as beam wander models for a ground-to-satellite FSO uplink channel (i.e., from the optical ground station 250 to the satellite 240), beam parameters are first introduced for a Gaussian beam wave propagating through the atmospheric channel. The Gaussian beam wave in the plane of the transmitter at z=0 can be described as follows:

$$U_0(r, 0) = \exp\left(-\frac{r^2}{W_0} - i\frac{kr^2}{2F_0}\right) \quad \text{(Eq. 9)}$$

where r is a vector in the transverse direction, $W_0$ is the $1/e^2$ field radius of the beam, and $F_0$ is the phase front radius of curvature.

For a propagating distance of z, the free-space propagation of a Gaussian beam can be described by two sets of non-dimensional beam parameters, as follows:

$$\Theta_0 = 1 - \frac{z}{F_0},\ \Lambda_0 = \frac{2z}{\mathrm{k}W_0^2},\ \overline{\Theta}_0 = 1 - \Theta_0 \quad \text{(Eq. 10)}$$

$$\Theta = 1 + \frac{z}{F},\ \Lambda = \frac{2z}{\mathrm{k}W^2},\ \overline{\Theta} = 1 - \Theta \quad \text{(Eq. 11)}$$

where W and F are the spot size radius of the beam and phase front radius of curvature at the receiver plane.

For added context, FIG. 3 shows an illustrative representation 300 of a circular detection aperture 320 and a Gaussian beam profile 310 at a receiver, with misalignment in the receiver plane. As illustrated, the circular detection aperture 320 has a radius a, and the Gaussian beam profile 310 has a spot size of radius W. The misalignment between the transmitter and receiver results in a pointing error, $r_c$. When a pointing error of $r_c$ is present, due to the symmetry of the beam shape and the detector area, the fraction of the power collected by the detector, $I_p$, depends on the radial distance $r_c=\|r_c\|$.

Therefore, the fraction of the power collected by the detector of radius a can be approximated as follows:

$$I_p(r_c, z) \approx A_0\exp\left(-\frac{2r_c^2}{W_{eq}^2}\right) \quad \text{(Eq. 12)}$$

where $v = (\sqrt{\pi}a)/(\sqrt{2}W)$, and $$A_0 = [\mathrm{erf}(v)]^2,\quad W_{eq}^2 = W^2\frac{\sqrt{\pi}\,\mathrm{erf}(v)}{2v\exp(-v^2)} \quad \text{(Eq. 13)}$$

where $A_0$ denotes the coupling loss including transmit aperture gain, free-space path loss, and receive aperture gain, and $W_{eq}$ is the equivalent beam width.

If independent and identical Gaussian distributions are considered for the displacements along the x- and y-axes, the radial displacement $r_c$ can be modeled by a so-called Rayleigh distribution, as follows:

$$f_{r_c}(r_c) = \frac{r_c}{\sigma_{r_c}^2}\exp\left(-\frac{r_c^2}{2\sigma_{r_c}^2}\right),\quad r_c > 0 \quad \text{(Eq. 14)}$$

where $$\sigma_{r_c}^2$$

is the random radial displacement variance at the receiver.

Combining (14) and (12), the PDF of $I_p$ can be expressed as follows:

$$f_{I_p}(I_p) = \frac{\gamma^2}{A_0^{\gamma^2}}I_p^{\gamma^2-1},\ 0 \le I_p \le A_0 \quad \text{(Eq. 15)}$$

where $\gamma = W_{eq}/2\sigma_{r_c}$.

Considering the PDFs given by (5) and (15) for $I_a$ and $I_p$, and since $I_l$ is deterministic, an aggregate PDF can be given for $I=I_lI_aI_p$, which can model the atmospheric attenuation, beam scintillation, and pointing error as follows:

$$f_I(I) = \frac{\gamma^2}{2(A_0I_l)^{\gamma^2}}I^{\gamma^2-1}\mathrm{erfc}\left(\frac{\ln\left(\frac{I}{A_0I_l}\right)+\mu}{\sqrt{8}\sigma_\chi}\right)\exp\left(2\sigma_\chi^2\gamma^2(1+\gamma^2)\right) \quad \text{(Eq. 16)}$$

where $$\mu = 2\sigma_\chi^2(1+2\gamma^2),$$

and erfc(•) is the complementary error function.

As noted above, in addition to the atmospheric effects and pointing error effects described above, FSO communication reliability can also be impacted by beam wander. A finite optical beam will randomly wander as it propagates through turbulent atmospheric scale sizes on the order of the beam or larger. Due to the beam wandering effect, the beam centroid will randomly move in the receiver plane, which can cause a pointing error similar to that of a residual pointing error due to transmit and receive aperture misalignment. Further, the hot-spot of the beam (i.e., the point in the beam profile with the maximum intensity) tends to randomly move around the beam centroid, which can lead to an effective pointing error displacement of the beam that is distinct from the centroid displacement. Such beam wander can result in an increase in the detected on-axis scintillation index.

To further describe beam wander effects, FIG. 4A shows an illustrative representation 400*a* of random movement of a beam centroid 410 in a receiver plane due to beam wander, and FIG. 4B shows an illustrative representation 400*b* of random movement of a beam hot-spot 430 around a beam centroid 410 due to beam wander. Beam wander can be modeled at the receiver plane as if it arises from a random tilt angle at the transmitter plane. In FIG. 4A, it can be seen that the combined movement of the hot-spot and short-term beam centroid 410 paints out a larger circle over a long time period. The larger dashed circle can be referred to as the long-term spot size, $W_{LT}$ 420.

For a ground-to-satellite uplink FSO channel, $W_{LT}$ 420 can be described as follows:

$$W_{LT} = W\sqrt{1 + 4.35\mu_{2u}\Lambda^{5/6}k^{7/6}(H_{SAT} - h_0)^{5/6}\sec^{11/6}(\theta_{z_{G-S}})} \quad \text{(Eq. 17)}$$

where $\mu_{2u}$ is given by:

$$\mu_{2u} = \int_{h_0}^{H_{SAT}} C_n^2(h)\left(1 - \frac{h - h_0}{H_{SAT} - h_0}\right)^{5/3} dh \quad \text{(Eq. 18)}$$

As illustrated in FIG. 4A, the short-term spot size, $W_{ST}$, can be given as follows:

$$W_{ST}^2 = W_{LT}^2 - \langle r_c^2 \rangle \quad \text{(Eq. 19)}$$

where $$\langle r_c^2 \rangle$$

is the beam wander displacement variance.

This variance can be described as follows:

$$\langle r_c^2 \rangle = 0.54(H_{SAT} - h_0)^2 \sec^2(\theta_{z_{G-S}})\left(\frac{\lambda}{2W_0}\right)^2\left(\frac{2W_0}{r_0}\right)^{5/3}\left[1 - \left(\frac{\kappa_0^2 W_0^2}{1 + \kappa_0^2 W_0^2}\right)^{1/6}\right] \quad \text{(Eq. 20)}$$

where $\kappa_0$ is a scaling parameter related to the outer-scale values and $r_0$ is the atmospheric coherence width.

The atmospheric coherence width (also called Fried's parameter) can be defined as follows:

$$r_0 = \left[0.42\sec(\theta_{z_{G-S}})k^2\int_{h_0}^{H_{SAT}} C_n^2(h)dh\right]^{-3/5} \quad \text{(Eq. 21)}$$

Referring to FIG. 4B, the pointing variance due to the random movement of the beam hot-spot 430 around the beam centroid 410 for a collimated beam can be described as follows:

$$\sigma_{pe}^2 = 0.54(H_{SAT} - h_0)^2\sec^2(\theta_{z_{G-S}})\left(\frac{\lambda}{2W_0}\right)^2\left(\frac{2W_0}{r_0}\right)^{5/3}\left[1 - \left(\frac{C_r^2 W_0^2/r_0^2}{1 + C_r^2 W_0^2/r_0^2}\right)^{1/6}\right] \quad \text{(Eq. 22)}$$

where the parameter $C_r$ is a scaling constant that is typically in the range of 1 to 2 π. A good fit between theory and simulation results can be obtained by selecting $C_r=\pi$.

Considering both the beam scintillation and beam wander effects together, the received irradiance statistics $I_a$ can be modeled as follows:

$$I_a = I_{a_{sci}} \times I_{a_{bw}} = \exp(2\chi)\exp\left(-\frac{2r_c^2}{W_{ST}^2}\right) \quad \text{(Eq. 23)}$$

where $I_{a_{sci}}$ is the channel coefficient due to scintillation, and $I_{a_{bw}}$ is the channel coefficient due to beam wander induced pointing error. It should be noted that there will be an increase in the scintillation index of $I_{a_{sci}}$ due to random displacement of the beam hot-spot around the beam centroid.

In the preceding equation, $\chi$ is the log-amplitude of the beam which is normally distributed with mean $\mu_\chi$ and variance $$\sigma_\chi^2,$$

which can be described as follows:

$$\mu_\chi = -\sigma_\chi^2$$
$$\sigma_\chi^2 = \frac{1}{4}\ln(1 + \sigma_I^2(r, z)) \quad \text{(Eq. 24)}$$

where $$\sigma_1^2(r, z)$$

is the scintillation index which is affected by the beam wander.

The scintillation index evaluated at the displacement $r=\sigma_{pe}$ can be described as follows:

$$\sigma_I^2(r = \sigma_{pe}, z) = 5.95(H_{SAT} - h_0)^2\sec^2(\theta_{z_{G-S}})\left(\frac{2W_0}{r_0}\right)^{5/3}\left(\frac{\alpha_{pe}}{W}\right)^2 + 8.70\mu_{3u}k^{7/6}(H_{SAT} - h_0)^{5/6}\sec^{11/6}(\theta_{z_{G-S}}) \quad \text{(Eq. 25)}$$

where $\alpha_{pe}=\sigma_{pe}/z$. This quantity is the jitter-induced angular pointing error, $\mu_{3u}$, which can be described as follows:

$$\mu_{3u} = \mathrm{Re}\int_{h_0}^{H_{SAT}} C_n^2(h)\left\{\xi^{5/6}\left[\Lambda\zeta + i\left(1-\overline{\Theta}\xi\right)\right]^{5/6} - \Lambda^{5/6}\xi^{5/3}\right\}dh \quad \text{(Eq. 26)}$$

$$\text{and } \xi = 1(h-h_0)/(H_{SAT}-h_0).$$

Thus, $I_{a_{sci}}$ in (23) follows a log-normal distribution similar to (5) with a modified log-amplitude mean and variance, as given by (24) and (25). Notably, $I_{a_{bw}}$ in (23) is similar to that of $I_p$ in (12), such that it can be modeled according to the approach used to model $I_p$. In (23), $r_c$ denotes the radial random displacement of the centroid of the beam from the center of receiver, which is defined by the random displacement of the centroid of the propagated beam along the X and Y coordinates, $r_{c_X}$ and $r_{c_Y}$. These are normal random variables with zero mean and equal standard deviations. Therefore, the radial displacement follows a so-called Rayleigh distribution having a PDF given by (14). Combining $$\exp\left(-2r_c^2/W_{ST}^2\right)$$

with (14), and considering the coupling loss, the PDF of $I_{a_{bw}}$ can be described as follows:

$$f_{I_{a_{bw}}}\left(I_{a_{bw}}\right) = \frac{\gamma^2}{A_0^{\gamma^2}} I_{a_{bw}}^{\gamma^2-1},\ 0 \le I_{a_{bw}} \le A_0 \quad \text{(Eq. 27)}$$

$$\text{where } \gamma = W_{ST}/2\sigma_{r_c}.$$

Considering log-normal distribution for $I_{a_{sci}}$, similar to (16), an aggregate PDF can be obtained for $I=I_l I_{a_{sci}} I_{a_{bw}}$, which can model the atmospheric attenuation, beam scintillation, and beam wandering effects as follows:

$$f_I(I) = \frac{\gamma^2}{2(A_0 I_l)^{\gamma^2}} I^{\gamma^2-1}\mathrm{erfc}\left(\frac{\ln\left(\frac{I}{A_0 I_l}\right)+\mu}{\sqrt{8}\sigma_\chi}\right)\exp\left(2\sigma_\chi^2\gamma^2\left(1+\gamma^2\right)\right) \quad \text{(Eq. 28)}$$

where $$\mu = 2\sigma_\chi^2\left(1+2\gamma^2\right).$$

Notably, while the PDFs given by (16) and (28) look to be the same, the manner of computing parameters, such as $\gamma$ and $$\sigma_\chi^2,$$

can be different for each different PDF.

As noted above, there are several typical sources of impairments to FSO communication links. Some types, such as atmospheric attenuation and atmospheric turbulence, are dependent on atmospheric conditions and tend to be dominant at altitudes below A0 205 (e.g., in the first 20 kilometers of the atmosphere above the ground). Other types, such as pointing misalignment and free-space path loss, are independent of atmospheric conditions. However, the detailed analysis above demonstrates that the effects of all of these impairments, whether or not atmospherically dependent, increase over distance. Thus, while FSO communication links have been widely explored for use in terrestrial communication systems, their use has tended to be avoided in ground-to-satellite applications.

One approach to implementing a reliable FSO link is described in U.S. patent application Ser. No. 18/296,436, titled "Relayed Ground-To-Satellite Free-Space-Optical Communications," filed Apr. 6, 2023, the disclosure of which is incorporated herein in its entirety. There, extensive analytical and simulation results confirm that atmospheric effects are most prominent in the first 20 kilometers over the Earth's surface and can be mitigated by using different configurations of HAPS and low-altitude platform system (LAPS) relays to split a ground-satellite FSO link into multiple FSO sub-links.

Even with multiple FSO sub-links, however, performance is frustrated by the limited availability of the ground-satellite link due to signal attenuation caused by clouds or fog. Different solutions have been explored to avoid limiting availability of the link (e.g., seeking to guarantee at least a minimum agreed-upon, required, or other availability level). One such approach is site diversity, in which several backup optical ground stations are distributed across large geographical regions. Such an approach can tend to be impractical due to several factors, including costs associated with building multiple optical ground stations and difficulty in identifying locations that do not have simultaneous obscurations and have the terrestrial fiber infrastructure capable of meeting feeder-link capacity requirements.

Another approach to improving link availability is the use of a hybrid RF/FSO link. In some cases, the RF link serves as a low-data rate backup that is only utilized when an outage in the FSO link becomes inevitable (e.g., when line of sight is lost due to clouds or fog). However, due to the large disparity in bandwidth between the RF and FSO links, such an approach is limited by the capacity of the RF link. In other cases, the RF link is used as a diversity link in which both the FSO and RF links transmit simultaneously. In addition to the difference in bandwidth, such cases can be limited by the RF and FSO links experiencing uncorrelated impairments over the same propagation path. As such, these types of implementations may further rely on techniques, such as diversity combining to recover the information, and/or coding and interleaving to leverage the diversity in propagation conditions (e.g., a fraction of encoded bits is transmitted through the RF channel and the remaining portion is simultaneously transmitted through the FSO channel, and a decoder at the receiver jointly processes the signal from the RF and FSO links to recover the information bits).

Embodiments described herein provide a novel type of hybrid RF/FSO ground-satellite link that mitigates the effects of atmospheric impairments on the FSO link, while also appreciably reducing adverse effects of bandwidth and propagation disparity between the RF and FSO links. In particular, embodiments include a high-altitude platform station (HAPS) that splits the ground-to-satellite link into at least two sub-links: a first sub-link from the ground terminal (e.g., gateway) to the HAPS implemented as a line-of-sight (LoS) multiple-in-multiple-out (MIMO) radio frequency (RF) link; and a second sub-link from the HAPS to the satellite implemented as a FSO link. Each sub-link experiences appreciably smaller effects from atmospheric channel impairments and alignment errors, which can appreciably improve the overall reliability of the link from the ground station to the satellite. For example, smaller sub-links will tend to have much lower attenuation and path loss compared to a single direct link, smaller sub-links will tend to have a reduced scintillation index (which is distance-dependent), and smaller sub-links will tend to experience reduced beam wander and pointing error effects (which are also distance-dependent). Further, such an approach can appreciably reduce RF/FSO link disparities by careful extraction of spatial multiplexing gain using MIMO in LoS propagation conditions in conjunction with the HAPS between a satellite gateway and one or more satellites.

As used herein, FSO communications generally refer to line-of-sight optical communications in the infrared IR, or more particularly the near-IR, frequency band. Although FSO can generally refer to line-of-sight communications in any optical frequency band, most bands do not have propagation characteristics suitable for the types of distances of concern in this disclosure.

Figure 5:
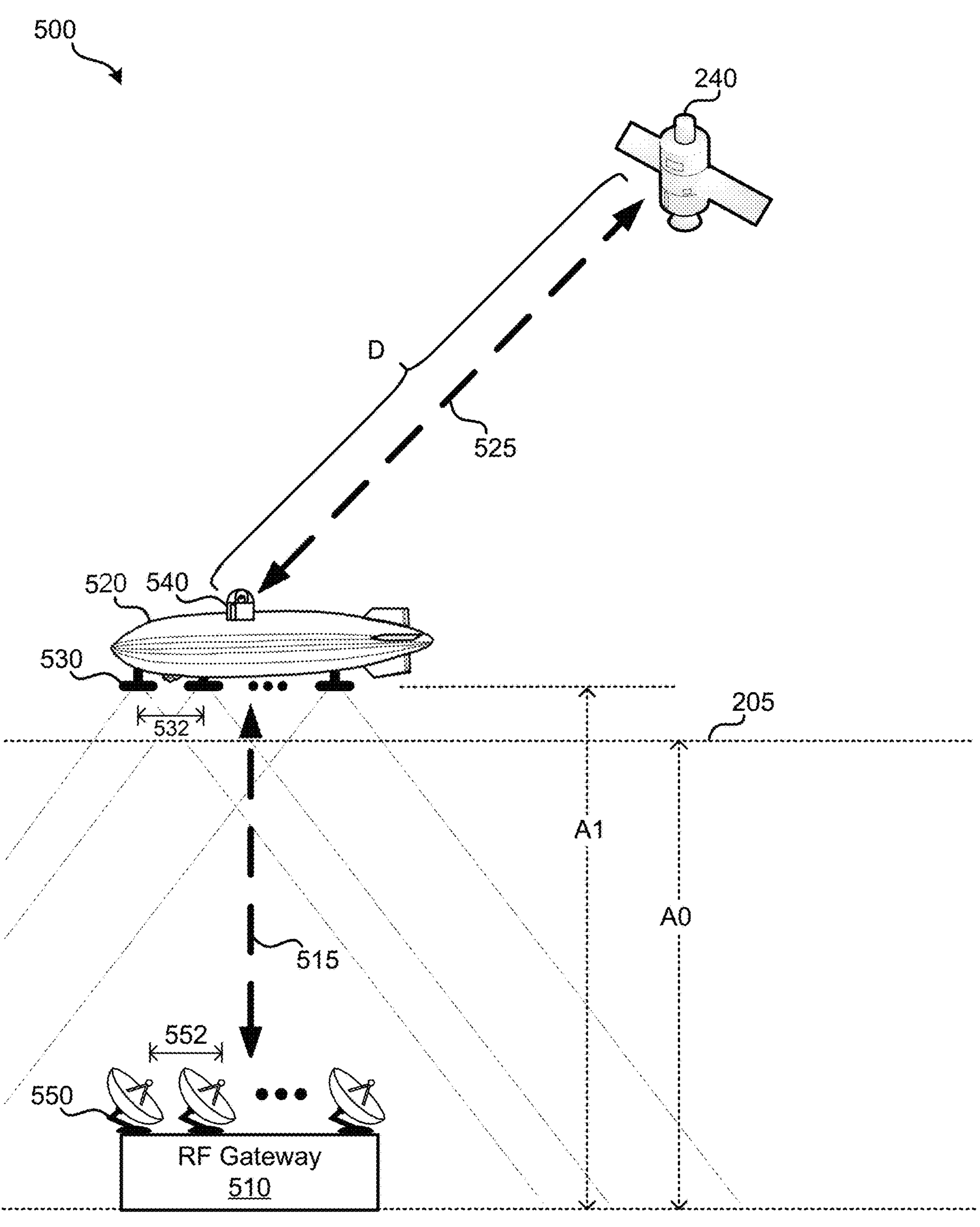
FIG. 5 shows an illustrative satellite communication system having a radio frequency (RF) ground station (gateway) in communication with a satellite via a high-altitude platform station (HAPS).

FIG. 5 shows an illustrative satellite communication system 500 having a radio frequency (RF) ground station (gateway) 510 in communication with a satellite 240 via a high-altitude platform station (HAPS) 520. The satellite 240 can be the satellite 240 of FIG. 2. The HAPS 520 can be implemented in any suitable manner to remain in a substantially fixed position over the Earth at an altitude (A1). For example, the HAPS 520 can be implemented as a stratospheric balloon (e.g., a stratolite), a high-altitude airship, a high-altitude pseudo-satellite, an unmanned aerial vehicle (i.e., a drone), a fixed-wing aircraft, a powered parafoil, a high-altitude tethered balloon, a helium aerostat, etc. A1 is typically in the lower stratosphere, at, near, or slightly above A0 105 (i.e., the atmospheric effect boundary). In some cases, A1 is further selected for practical concerns, such as to more easily stabilize a HAPS at an altitude having relatively low atmospheric wind. In some implementations, A1 is approximately 20 kilometers above the Earth.

The HAPS 520 effectively splits a ground-to-satellite communication link into two sub-links. A first sub-link is a LOS MIMO RF link 515 from the RF gateway 510 to the HAPS 520. A second sub-link is an FSO link 525 from the HAPS 520 to the satellite 240. Based on the detailed analyses presented above, it can be seen that high atmospheric attenuation and turbulence will be substantially negligible in the FSO link 525 (free-space path loss is not atmospherically dependent and will still impact the FSO link 525 over distance (D)). As illustrated, the HAPS 520 includes an optical transceiver station 540 to support the FSO link 525 and a MIMO RF transceiver station 530 to support the LoS MIMO RF link 515.

Figure 6:
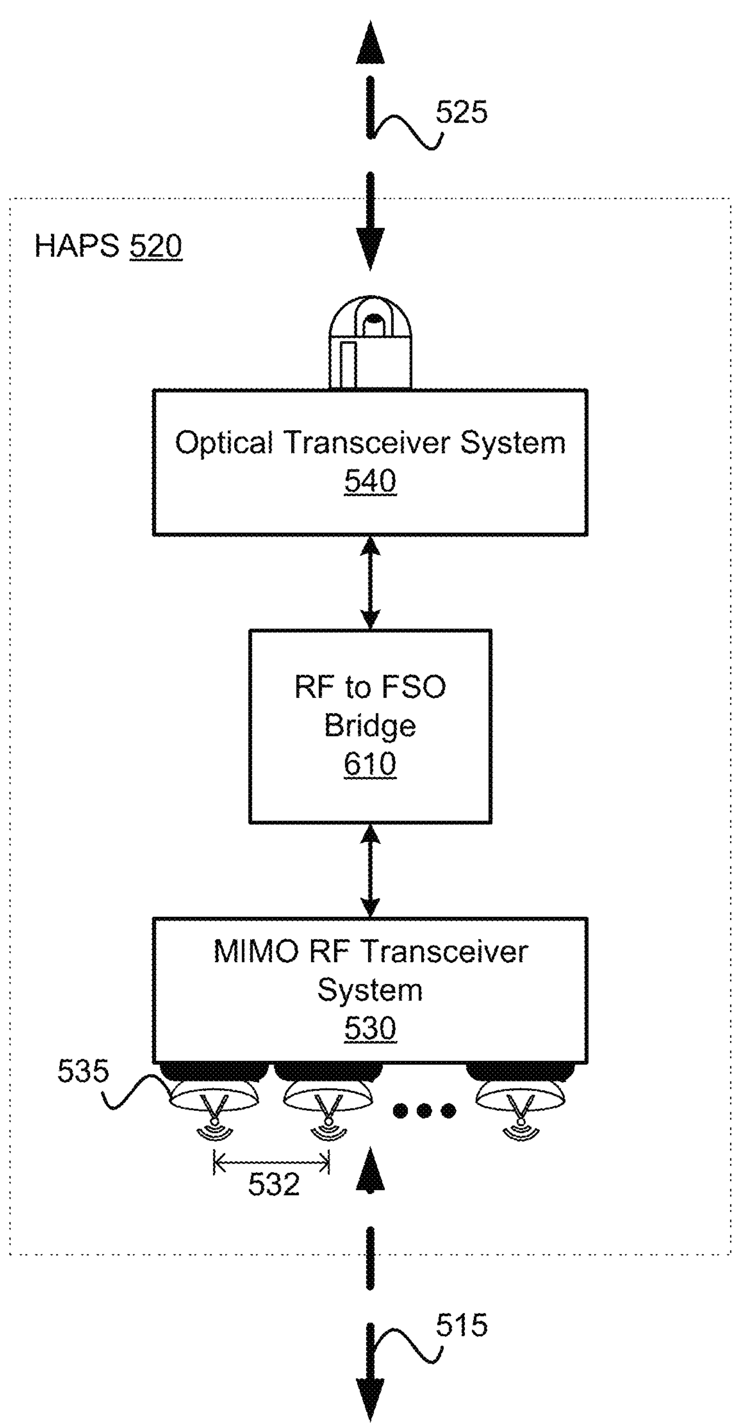
FIG. 6 shows a simplified block diagram of the communication system of the HAPS of FIG. 5.

FIG. 6 shows a simplified block diagram of the communication system of the HAPS 520 of FIG. 5. The illustrated HAPS 520 includes a MIMO RF transceiver station 530 and an optical transceiver station 522 in communication via an RF-to-FSO bridge 610. As shown, the MIMO RF transceiver station 530 includes several HAPS RF antennas 535, spaced apart at a HAPS antenna spacing 532. In some implementations, each HAPS RF antenna 535 is used for transmission and reception. In other implementations, some HAPS RF antennas 535 are used for transmission, and others are used for reception. The HAPS RF antennas 535 can be arranged as an antenna array, such as a uniform linear antenna array or a circular antenna array. Each transmitting HAPS RF antenna 535 has its own transmitter to convert signals to RF (e.g., from baseband) for transmission, and each receiving HAPS RF antenna 535 has its own receiver to process incoming RF signals and convert them (e.g., to baseband). The MIMO RF transceiver station 530 can include additional components to support communications via the LoS MIMO RF link 515, such as for channel estimation, feedback adaptation, spatial processing, beamforming, precoding, combining, digital baseband processing, coding, modulation, digital signal processing, antenna array and array processing, synchronization and timing, etc. Embodiments also include RF front-end components, such as amplifiers, filters, mixers, etc. Some embodiments of the MIMO RF transceiver station 530 are configured to operate at relatively high frequency bands, such as Ka band (approximately 26.5 GHz to 40 GHz), Q band (approximately 33 GHz to 50 GHz), V band (approximately 40 GHz to 75 GHz), E band (approximately 60 GHz to 90 GHz), etc.

The optical transceiver station 522 can include any suitable components for maintaining FSO communications via the FSO link 525 with the satellite 240. For example, the optical transceiver station 522 includes some or all of the laser components to generate, steer, focus, and otherwise transmit optical signals to the satellite 240; receiver components to capture, focus, detect, process, and otherwise receive optical signals from the satellite 240; acquisition and tracking components to locate, lock onto, and track movement of the satellite 240; and other components for modulation and coding, demodulation and decoding, error correction, data processing, etc. Similar to an optical ground station, such as in FIG. 2, the optical transceiver station 540 can transmit to the satellite 240 using an intensity-modulated optical signal (e.g., OOK).

As illustrated, the MIMO RF transceiver station 530 and the optical transceiver station 540 can be communicatively coupled via an RF-to-FSO bridge 610. The RF-to-FSO bridge 610 converts between MIMO RF signals and FSO signals. For example, in the feeder uplink, the MIMO RF transceiver station 530 receives MIMO RF signals via the LoS MIMO RF link 515 and passes them to the RF-to-FSO bridge 610, the RF-to-FSO bridge 610 converts the MIMO RF signals to FSO signals and passes them to the optical transceiver station 540, and the optical transceiver station 540 receives the FSO signals from the RF-to-FSO bridge 610 and transmits them to the satellite 240. In some embodiments, signals are passed through the RF-to-FSO bridge 610 using an intermediate bridge protocol. For example, the bridge protocol can be a baseband frequency below the MIMO RF and FSO frequencies, an intermediate frequency between the MIMO RF and FSO frequencies, etc. Conversion to and from the bridge protocol can also involve additional encoding and/or decoding, modulation and/or demodulation, up-conversion and/or down-conversion, filtering, etc. In some such embodiments, the MIMO RF transceiver station 530 converts between MIMO RF signals and bridge-protocol signals, and the optical transceiver station 540 converts between FSO signals and bridge-protocol signals. For example, in the feeder uplink, the MIMO RF transceiver station 530 receives MIMO RF signals and converts them to bridge-protocol signals, the RF-to-FSO bridge 610 passes the bridge-protocol signals to the optical transceiver station 540 (e.g., with additional processing), and the optical transceiver station 540 converts the bridge-protocol signals to FSO signals for transmission. In other such embodiments, the RF-to-FSO bridge 610 converts between MIMO RF signals and bridge-protocol signals and between FSO signals and bridge-protocol signals. For example, in the feeder uplink, the MIMO RF transceiver station 530 receives MIMO RF signals and passes them to the RF-to-FSO bridge 610, the RF-to-FSO bridge 610 converts them to bridge-protocol signals and then from bridge-protocol signals to FSO signals (e.g., with additional processing), and the RF-to-FSO bridge 610 passes the FSO signals to the optical transceiver station 540 for transmission.

Returning to FIG. 5, the HAPS 520 effectively serves as a relay station at an altitude of A1 (e.g., approximately 20 km) between the RF gateway 510 and the satellite 240. For example, most atmospheric disturbances that significantly affect an FSO link tend to occur within the first 20 km of altitude, and the HAPS 520 is positioned at or above that altitude. To mitigate the challenges posed by cloud blockage and other atmospheric channel impairments that would be present in a ground-to-satellite FSO link, the LoS MIMO RF link 515 is used between the RF gateway 510 and the HAPS 520, and the FSO link 525 is only between the HAPS 520 and the satellite 240 (i.e., above A1). The LoS MIMO nature of the RF link (i.e., the LoS MIMO RF link 515) can address the capacity disparity between the RF and FSO bands.

As shown, the RF gateway 510 includes several ground RF antennas 550 equally spaced apart at a ground antenna spacing 552. The ground RF antennas 550 can be arranged as an antenna array, such as a uniform linear antenna array or a circular antenna array. According to the convention used herein, the RF gateway 510 has $N_G$ ground RF antennas 550 that are equally spaced, and the HAPS 520 has $N_H$ antennas that are also equally spaced. The spacing and other aspects of the setup ensure LoS MIMO connectivity in both the uplink and downlink paths over the LoS MIMO RF link 515. In the context of an uplink scenario, under the assumption of an additive white Gaussian noise (AWGN) channel, the received signal at the HAPS 520, in its complex baseband form, can be expressed as follows:

$$r_H = Hs + n_H \quad \text{(Eq. 29)}$$

where $r_H \in \mathbb{C}^{N_H}$, $H \in \mathbb{C}^{N_H \times N_G}$, $s \in \mathbb{C}^{N_G}$, and n $$\in N(0, \sigma_n^2)$$

correspond to the received signal vector, the channel response matrix, the transmitted signal vector, and the AWGN noise vector, respectively.

The HAPS 520 is presumed to function as a regenerative relay, involving processes like decoding, demodulation, and subsequent reprocessing of information bits. As described above, embodiments of the optical transceiver station 540 (and/or the RF-to-FSO bridge 610) can then re-modulate the bits through an optical modulator, such as with intensity modulation through ON-OFF keying (OOK), supplemented by a booster optical amplifier at the transmitter. On the receiving end of the satellite 240, embodiments can use direct detection by an optically pre-amplified PIN photodetector. The photodetector's output current encompasses noise from diverse sources which include amplified spontaneous emission (ASE) noise generated by optical amplifiers and signal shot noise, both of which exhibit dependence on the signal. This implies that the noise variance varies for the ON and OFF states of the OOK modulation. Given the negligible impact of atmospheric effects at altitudes above A1, the channel impairment in the FSO link 525 will be primarily due to free-space path loss. The electrical signal at the photodetector's output can be approximated by a Gaussian distribution, with distinct properties for OFF and ON symbols.

Consequently, the received signals at the satellite receiver for ON and OFF states can be expressed as:

$$r_{S,ON} = G_{RX} R P_{T_H} G_{TX} I_l s' + n_{ON} + I_D + I_{cb} + I_{ASE,RX} + I_{ASE_{TX \to RX}} \quad \text{(Eq. 30)}$$

$$r_{S,OFF} = n_{OFF} + I_D + I_{cb} + I_{ASE,RX}$$

where $P_{T_H}$ is the transmitted optical power at the HAPS 520; $G_{TX}$ is the transmitter booster amplifier gain, $G_{RX}$ is the receiver optical amplifier gain; R is the photodetector responsivity; $I_l$ is the channel coefficient representing the coupling loss including transmit aperture gain, receiver aperture gain, and free-space path loss; $s' \in \{0,1\}$ is the transmitted information bit from the HAPS 502; $I_D$ is the dark current; $I_{cb}$ is the current at the photodetector output due to background radiations from celestial bodies; $I_{ASE,RX}$ is the current at the photodetector output due to receiver optical amplifier ASE noise; and $I_{ASE_{TX \to RX}}$ is the current at the photodetector output due to received ASE noise from the transmitter booster optical amplifier. $n_{ON}$ and $n_{OFF}$ denote the AWGN with zero mean and variances $$\sigma_{ON}^2 \sigma_{OFF}^2$$

that represent all noises at the photodetector for ON and OFF states, respectively. The noise variances of ON and OFF states, respectively, are given as $$\sigma_{ON}^2 = \sigma_{sig-shot}^2 + \sigma_{back-shot}^2 + \sigma_{ASE-shot}^2 + \sigma_{dark-shot}^2 + \sigma_{sig-back}^2 + \sigma_{sig-ASE}^2 + \sigma_{back-ASE}^2 + \sigma_{ASE-ASE}^2 + \sigma_{back-back}^2 + \sigma_{thermal}^2$$

and $$\sigma_{OFF}^2 = \sigma_{back-shot}^2 + \sigma_{ASE-shot}^2 + \sigma_{dark-shot}^2 + \sigma_{back-ASE}^2 + \sigma_{ASE-ASE}^2 + \sigma_{back-back}^2 + \sigma_{thermal}^2.$$

In some embodiments, the HAPS antenna spacing 532 and the ground antenna spacing 552 are the same. Because of the large distance between the RF gateway 510 and the HAPS 520 (corresponding to A1), providing maximum capacity over the LoS MIMO RF link 515 can involve antenna spacings on the order of several meters, as detailed below. Consequently, dimensions of the HAPS 520 (e.g., and potentially also available space at the location of the RF gateway 510) can impose practical limitations on the number of antennas and/or the antenna spacing used to support the high-capacity LoS MIMO RF link 515.

Figure 7:
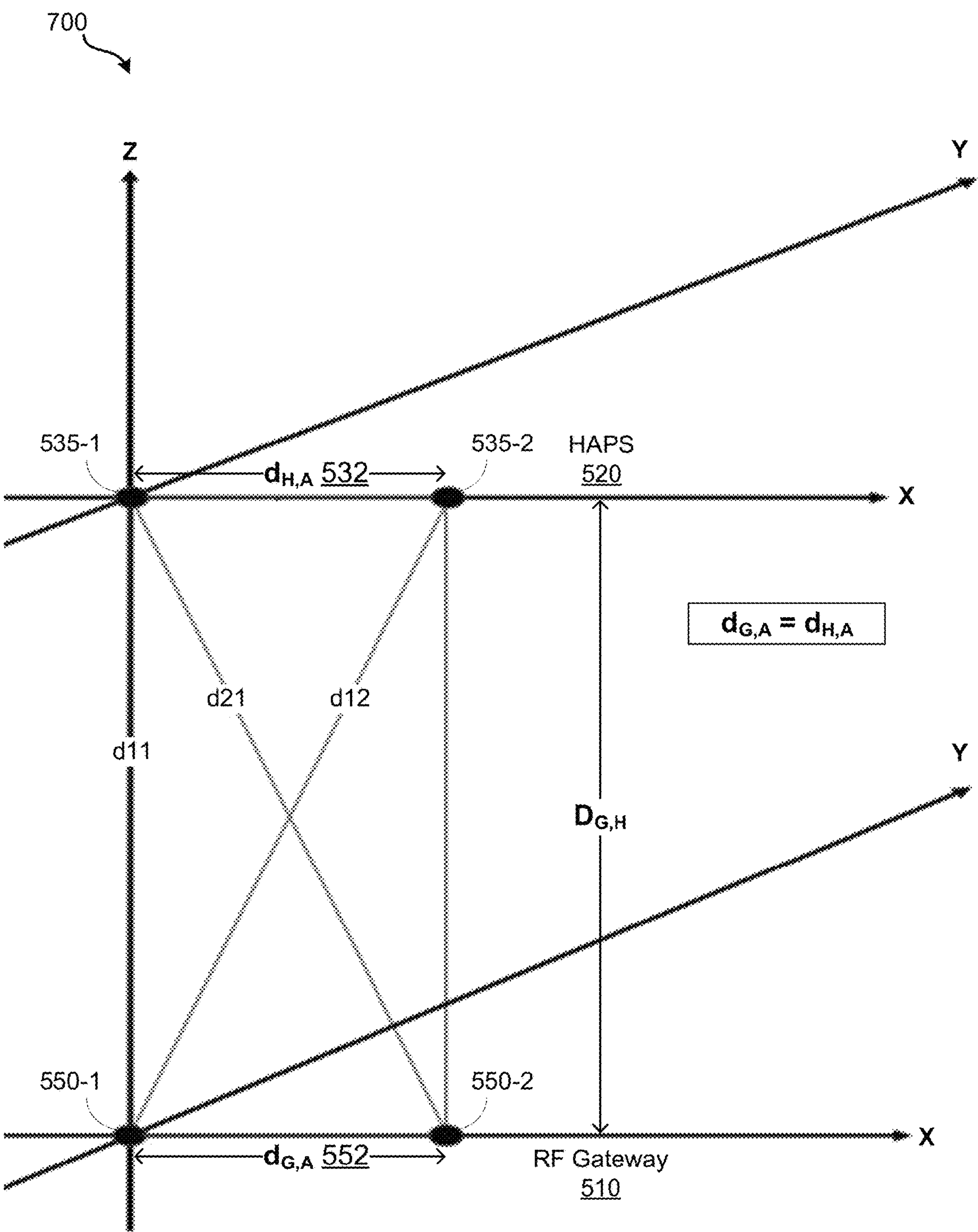
FIG. 7 shows an example of a capacity analysis framework for the line-of-sight (LoS) multiple-in-multiple-out (MIMO) radio frequency (RF) link.

Designing the LoS MIMO RF link 515 for maximum capacity can involve developing a capacity analysis framework. FIG. 7 shows an example of a capacity analysis framework 700 for the LoS MIMO RF link 515. Due to space constraints (e.g., typically driven by dimensions of the HAPS 520), it can be desirable to determine a smallest antenna spacing at both the RF gateway 510 (the ground antenna spacing 552) and at the HAPS 520 (the HAPS antenna spacing 532). The illustrated framework 700 assumes that the HAPS antenna spacing 532 and the ground antenna spacing 552 are the same. This spacing varies based on different positions of the HAPS 520 in relation to the RF gateway 510 and can be determined with the goal of achieving a maximum capacity. As used herein, "maximum"

capacity refers to a capacity that is maximized within design constraints and other practical constraints of the environment. The term "optimum" is also used herein to describe a capacity that is maximized within design constraints and other practical constraints of the environment, such as in accordance with an optimization framework, such as a capacity analysis framework (e.g., as described below). As described above, the successful integration of LoS MIMO in the link between the RF gateway 510 and the HAPS 520 can significantly enhance the capacity of the RF link. This can help to address the capacity constraints of the RF link, thereby overcoming conventional limitations of FSO, or hybrid FSO/RF links between RF gateways 510 and satellites 240.

In the scenario where the HAPS 520 receiver possesses accurate channel information, while no prior channel knowledge is accessible at the ground station transmitter, and under the assumption that the total transmit power is evenly distributed across all transmit elements, the capacity of this particular system can be expressed as follows:

$$C = \log_2\left(\det\left(I_{N_H} + \frac{\rho}{N_G} HH^H\right)\right) \quad \text{(Eq. 31)}$$

where $I_{N_H}$ is the $N_H \times N_H$ identity matrix, ρ denotes the average received signal-to-noise ratio (SNR) at the input of the receiver, and $[\bullet]^H$ denotes the Hermitian conjugate transpose.

Assuming isotropic antennas, the complex response between a transmit element n and a receive element m, $h_{m,n}$, in a free space environment is given as:

$$h_{m,n} = \frac{e^{-j\frac{2\pi}{\lambda}d_{m,n}}}{d_{m,n}} \quad \text{(Eq. 32)}$$

Assuming that the relative differences in path loss are negligible, the normalized free-space channel response matrix of an $N_H \times N_G$ where ground station acts as a transmitter and HAPS acts as a receiver, can be given by:

$$H = \begin{bmatrix} h_{1,1} & h_{1,2} & \dots & h_{1,N_G} \\ h_{2,1} & h_{2,2} & \dots & h_{2,N_G} \\ \vdots & \vdots & \ddots & \vdots \\ h_{N_H,1} & h_{N_H,2} & \dots & h_{N_H,N_G} \end{bmatrix} \quad \text{(Eq. 33)}$$

where $h_{m,n}$ is given by (32). It can be seen from (32) that the channel response matrix is deterministic and depends only on the distances between transmit and receive elements.

Within a MIMO system, it is established that an inter-element spacing equivalent to half a wavelength is sufficient to mitigate significant correlation among received signals. Nevertheless, in a line-of-sight (LoS) scenario, this level of spacing yields highly correlated signals. It can be seen from (31) that for a time-invariant MIMO channel, the maximum capacity is achieved under the following condition:

$$HH^H = N_G I_{N_H} \quad \text{(Eq. 34)}$$

In order to optimize the determinant as defined in (31), the eigenvalues of $HH^H$ need to be uniform, a condition met when equation (34) is satisfied. In practical terms, this represents a scenario in which all MIMO sub-channels are orthogonal, effectively yielding $N_H$ single-input single-output (SISO) links. By substituting (33) into (34) and expanding the expression outlined in (34), an alternative representation can be derived as follows:

$$h_k \cdot h_l = \begin{cases} N_G & \text{for } k = 1 \\ 0 & \text{for } k \neq 1 \end{cases} \quad \text{(Eq. 35)}$$

where $h_p$ denotes the $p^{th}$ row of the matrix H and k, $l \in \{1, 2, \dots, N_H\}$. By utilizing (32) and (33), it becomes evident that the validity of the first case in (35) is always true. Furthermore, the second case in (35) can be expressed in relation to the distances between individual transmit and receive antennas, as follows:

$$\sum_{p=1}^{N_G} e^{-j\frac{2\pi}{\lambda}(d_{k,p} - d_{l,p})} = 0 \text{ for } k \neq 1 \quad \text{(Eq. 36)}$$

To derive a more practical expression from (36), the framework 700 of FIG. 7 considers a 2×2 LoS MIMO setup. In this depicted setup, the HAPS 520 is positioned directly above the RF gateway 510, with an elevation of 90 degrees and zero orientation angle. Given the system arrangement outlined in FIG. 7, the condition presented in (36) simplifies to:

$$e^{-j\frac{2\pi}{\lambda}(d_{1,1} - d_{2,1})} + e^{-j\frac{2\pi}{\lambda}(d_{1,2} - d_{2,2})} = 0 \quad \text{(Eq. 37)}$$

Equation (37) has infinite solutions given by:

$$\left|\frac{2\pi}{\lambda}(d_{1,1} - d_{2,1}) - \frac{2\pi}{\lambda}(d_{1,2} - d_{2,2})\right| = (2r+1)\pi \quad \text{where } r \in \mathbb{Z}^+. \quad \text{(Eq. 38)}$$

Taking into account the arrangement depicted in FIG. 7, and utilizing the connection between the link distance ($D_{G,H}$), the spacing between each transmit and receive antenna element ($d_{n,m}$), the ground antenna spacing 552 ($d_{G,A}$), and the HAPS antenna spacing 532 ($d_{H,A}$), a more practical criterion concerning the inter-antenna spacing at both the transmitter (RF gateway 510) and the receiver (HAPS 520) emerges. This criterion directly lends itself to the design of a maximum capacity LoS MIMO system and can be formulated as:

$$\left|\frac{2\pi}{\lambda}\left(D_{G,H} - \sqrt{D_{G,H}^2 + d_{H,A}^2}\right) - \frac{2\pi}{\lambda}\left(\sqrt{D_{G,H}^2 + d_{G,A}^2} - D_{G,H}\right)\right| = (2r+1)\pi \quad \text{(Eq. 39)}$$

To achieve the maximum capacity while minimizing antenna spacing, r can be set to '1'. Similarly, the maximum capacity criterion can be derived for cases where $N_G$, $N_H$>2, and for various positions of the HAPS 520 in relation to the RF gateway 510. As evident from (39), the criteria for maximum capacity are linked to parameters, including the distance between the RF gateway 510 and the HAPS 520, the ground antenna spacing 552, the HAPS antenna spacing 532, and the carrier frequency.

Using the framework 700 of FIG. 7, further assessment can be conducted by evaluating performance using derived analytical expressions for the LoS MIMO RF link 515 capacity. For example, the capacity of the LoS MIMO RF link 515 can be assessed relative to the performance of a single-in-single-out (SISO) link over the same distance in the same carrier frequency. The assessment can be used to ascertain a minimum required antenna spacing for both the ground antenna spacing 552 and the HAPS antenna spacing 532 to attain a maximum capacity across various combinations of ground RF antennas 550 and HAPS RF antennas 535 at different carrier frequencies. As used herein, terms like "minimum," "minimum required," and the like with reference to antenna spacing refers to antenna spacings that are minimized within design constraints and other practical constraints of the environment to achieve a particular desired capacity according to performance assessments. For the numerical analysis, the followings are assumed unless otherwise specified: $\rho$=20 dB, $D_{G,H}$=20 km, carrier frequency (f)={30, 60, and 90} GHz, and ($N_G$, $N_H$)={(2, 2), (3,3), and (4,4)}.

Figure 8A:
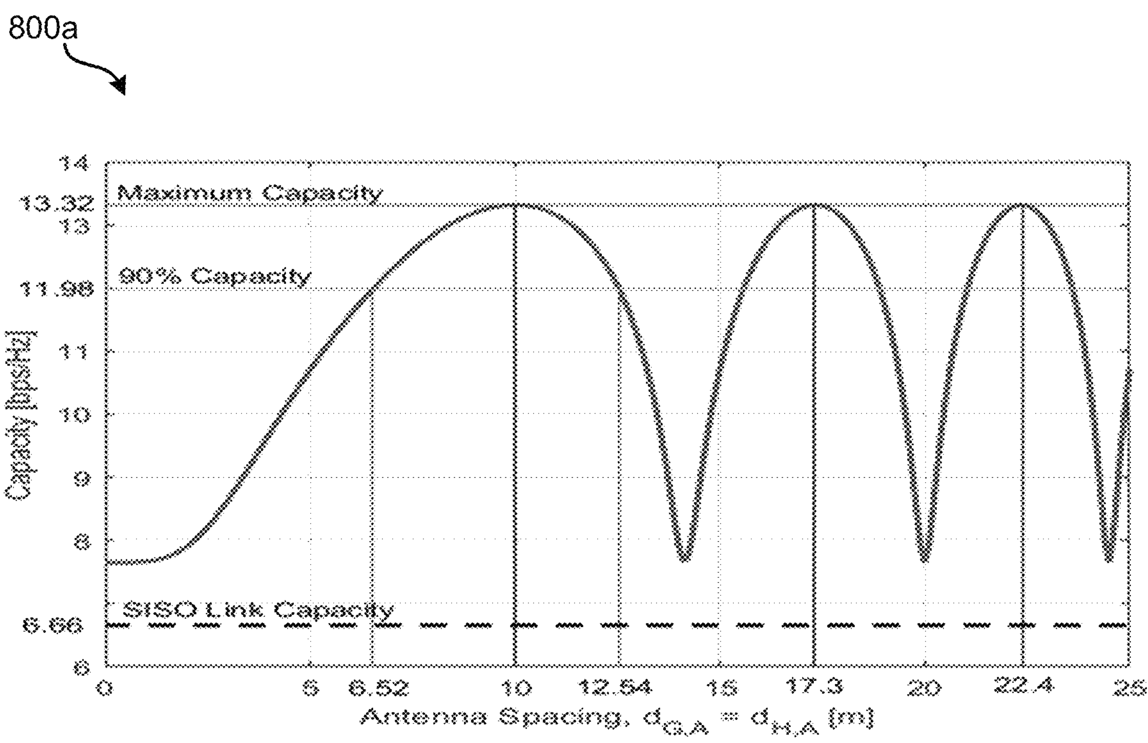
FIGS. 8A-8C show graphs representing illustrative capacity performance of a 2×2 LOS MIMO link as a function of ground antenna spacing and HAPS antenna spacing operating at carrier frequencies of 30, 60, and 90 GHz, respectively.
Figure 8B:
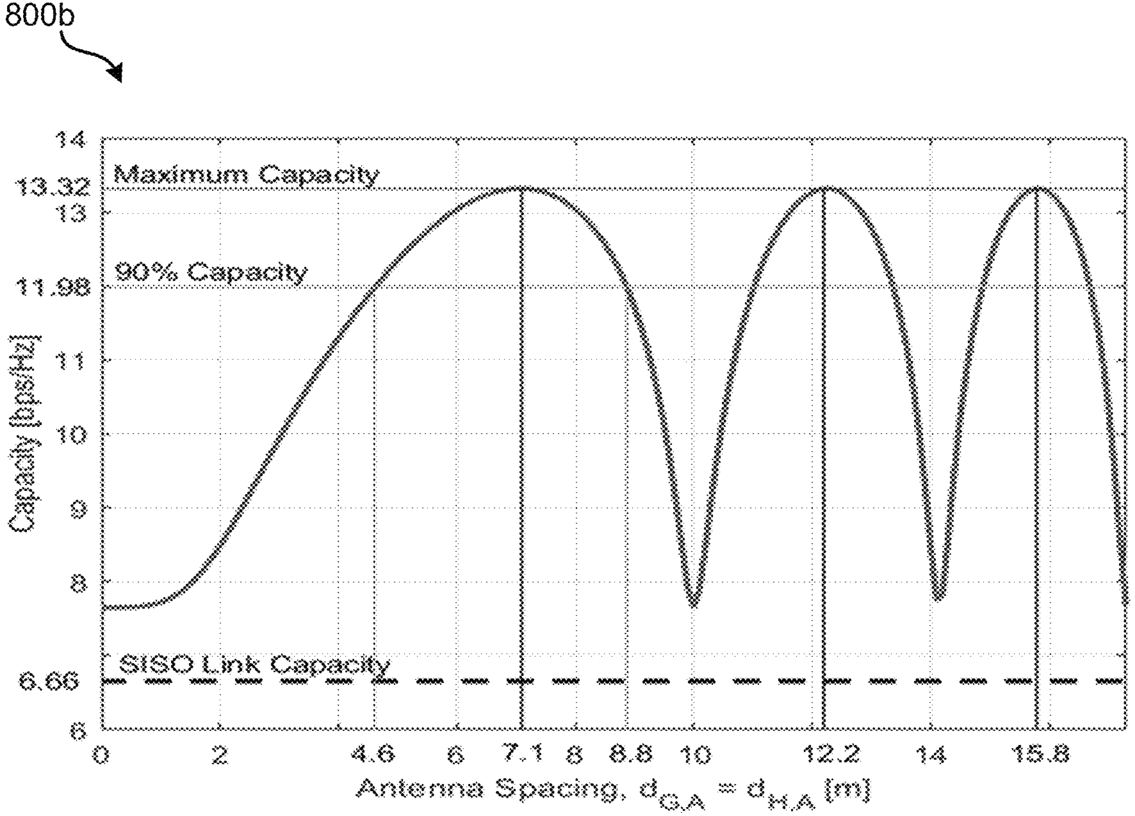
Figure 8C:
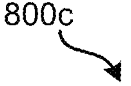
Figure 8C:
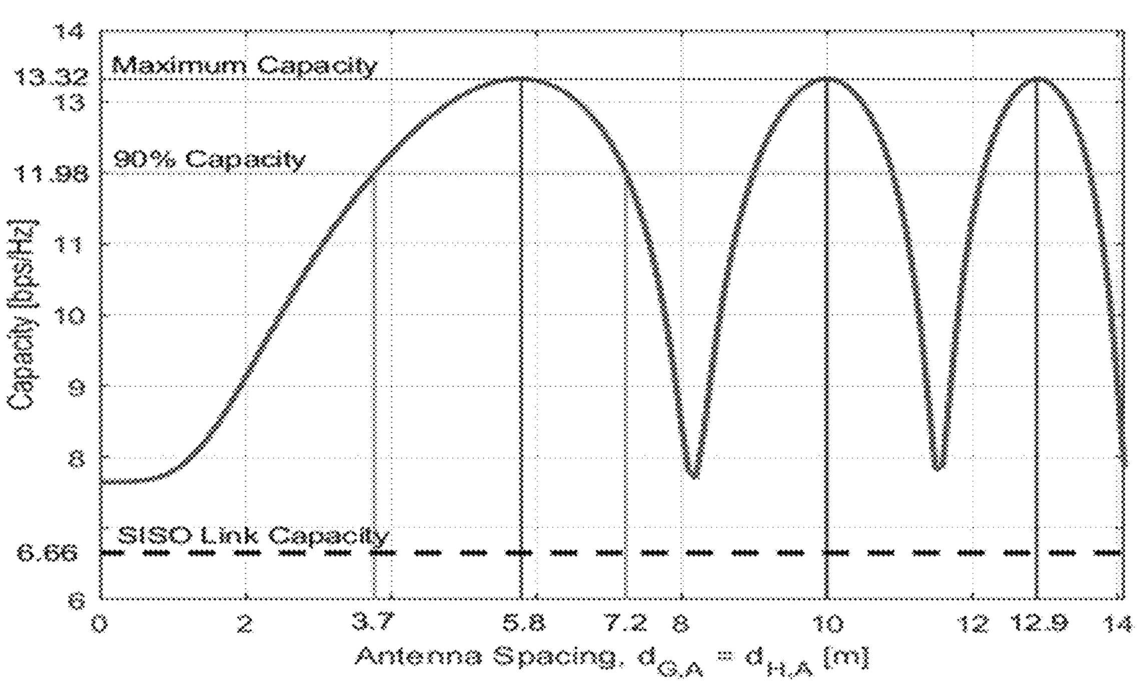

FIGS. 8A-8C show graphs 800 representing illustrative capacity performance of a 2×2 LoS MIMO link as a function of ground antenna spacing 552 and HAPS antenna spacing 532 operating at carrier frequencies of 30, 60, and 90 GHz, respectively. For consistency, uniform antenna spacing is assumed for both the ground antenna spacing 552 and the HAPS antenna spacing 532. The graph 800*a* in FIG. 8A highlights that the minimum required antenna spacing to attain peak capacity at both the RF gateway 510 and the HAPS 520 is approximately 10 meters. Further observation indicates that the system maintains over 90 percent of its maximum capacity within an antenna spacing range of 6.52 to 12.54 meters. To provide a benchmark, the capacity of a SISO link is also included. It is evident that strategic antenna spacing selection using a 2×2 LoS MIMO connection for the LoS MIMO RF link 515 can yield twice the capacity of a SISO link. FIGS. 8B and 8C illustrate that the minimum antenna spacing tends to diminish as the carrier frequency increases. This inverse relationship between frequency and antenna spacing can be particularly beneficial when considering the confined spatial constraints within the HAPS 520. Employing higher frequencies can effectively reduce the minimum antenna spacing, while still achieving optimal capacity.

Figures 9, 10:
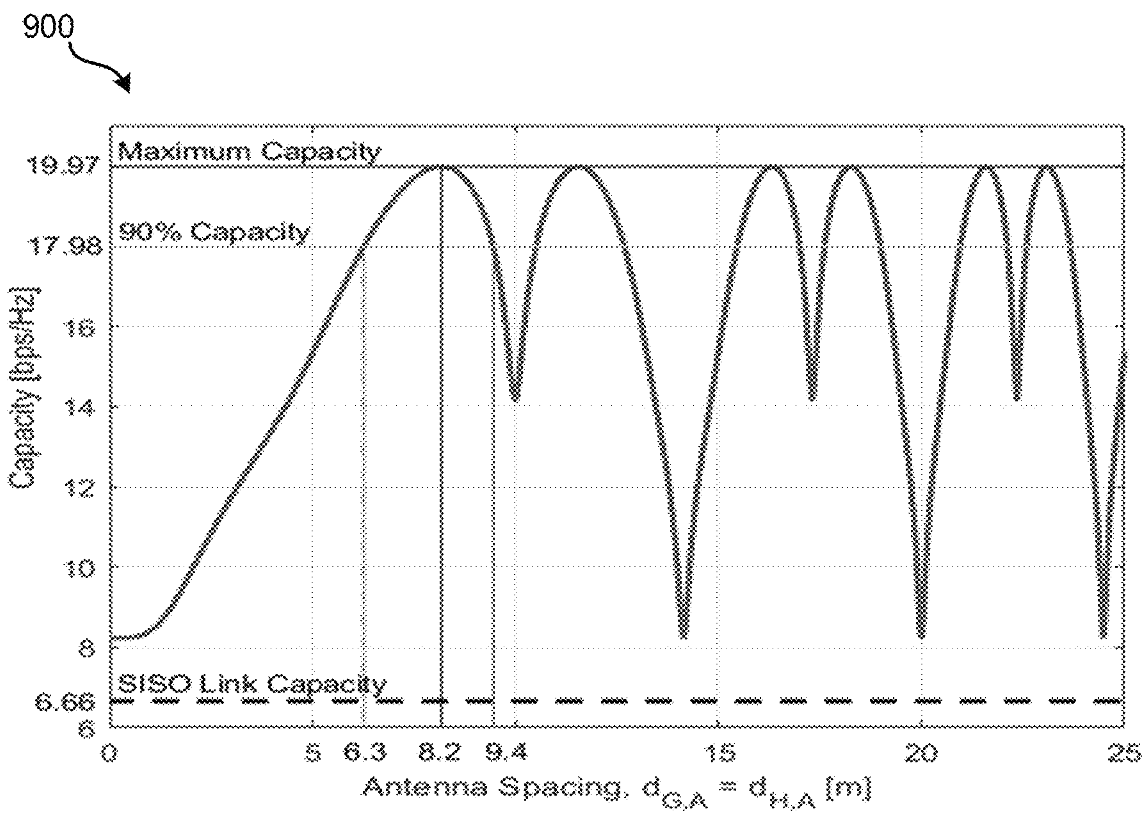
FIG. 9 shows a graph representing an illustrative capacity performance of a 3×3 LoS MIMO link as a function of ground antenna spacing and HAPS antenna spacing operating at a carrier frequency of 30 GHz.
FIG. 10 shows a graph representing an illustrative capacity performance of a 4×4 LoS MIMO link as a function of ground antenna spacing and HAPS antenna spacing operating at a carrier frequency of 30 GHz.

FIG. 9 shows a graph 900 representing illustrative capacity performance of a 3×3 LOS MIMO link as a function of ground antenna spacing 552 and HAPS antenna spacing 532 operating at a carrier frequency of 30 GHz. Again, equal antenna spacing is assumed for both the ground antenna spacing 552 and the HAPS antenna spacing 532. As illustrated, the minimum antenna spacing necessary to attain maximum capacity at the RF gateway 510 and HAPS 520 is 8.2 meters. Furthermore, the capacity remains above 90% within the antenna spacing range of 6.3 to 9.4 meters. For reference, the capacity of a SISO link is provided as a benchmark. The use of optimal antenna spacing with a 3×3 LoS MIMO RF link 515 can yield a threefold increase in capacity as compared to a SISO link. Comparing this result to the 2×2 cases of FIGS. 7A-7C reveals that increased antenna count can correspond to decreased required antenna spacing.

FIG. 10 shows a graph 1000 representing illustrative capacity performance of a 4×4 LOS MIMO link as a function of ground antenna spacing 552 and HAPS antenna spacing 532 operating at a carrier frequency of 30 GHz. Again, equal antenna spacing is assumed for both the ground antenna spacing 552 and the HAPS antenna spacing 532. As illustrated, the minimum antenna spacing necessary to attain maximum capacity at the RF gateway 510 and HAPS 520 is 7.1 meters. Furthermore, the capacity remains above 90% within the antenna spacing range of 5.7 to 7.9 meters. For reference, the capacity of a SISO link is provided as a benchmark. Use of optimal antenna spacing with a 4×4 LoS MIMO RF link 515 can yield a fourfold increase in capacity as compared to a SISO link. Comparing this result to the previous results further supports that increased antenna count can correspond to decreased required antenna spacing.

Figure 11:
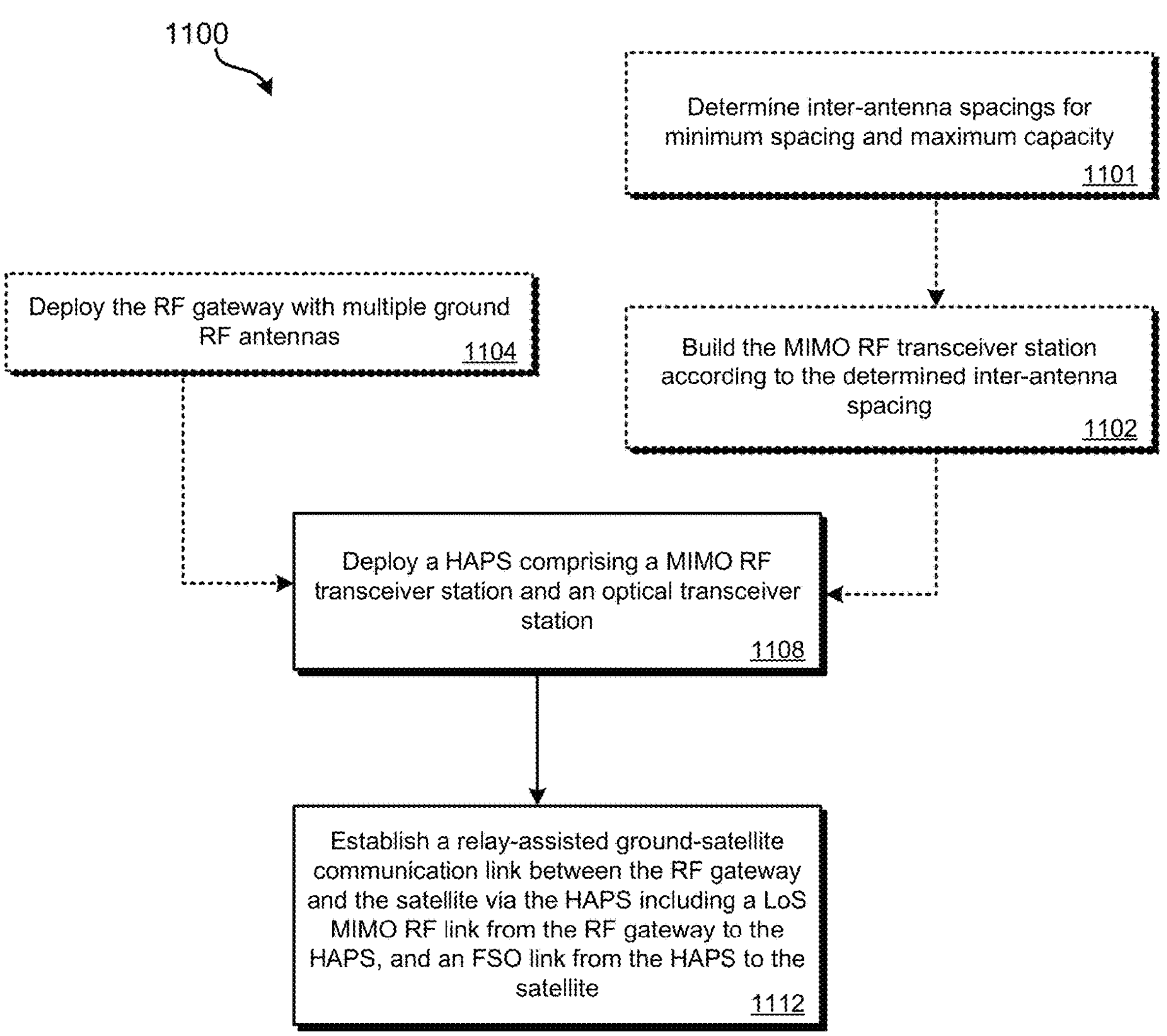
FIG. 11 shows a flow diagram of an illustrative method for providing ground-to-satellite communications, according to embodiments described herein.

FIG. 11 shows a flow diagram of an illustrative method 1100 for providing ground-to-satellite communications, according to embodiments described herein. Embodiments of the method 1100 begin at stage 1108 by deploying a HAPS. The HAPS can be deployed at a lower-stratospheric altitude above the Earth (e.g., around 20 km) in a location having line of sight to the RF gateway. As described herein, the deployed HAPS includes a MIMO RF transceiver station having several (i.e., 2 or more) HAPS RF antennas spaced apart by a HAPS antenna spacing distance. The HAPS RF antennas are configured to communicate with an RF gateway via a LoS MIMO RF link. The deployed HAPS also includes an optical transceiver station configured to establish an FSO link with a satellite. Each of the LoS MIMO RF link and the FSO link is a respective sub-link of a hybrid RF/FSO communication link between the RF gateway and the satellite.

At stage 1108, embodiments establish a relay-assisted ground-satellite communication link between the RF gateway and the satellite via the HAPS. For example, MIMO RF communications are established between the RF gateway and the HAPS via the LoS MIMO RF link, FSO communications are established between the HAPS and the satellite via the FSO link, and the HAPS (e.g., an RF-to-FSO bridge, or components of the MIMO RF transceiver station and/or optical transceiver station) convert between the MIMO RF communications and the FSO communications.

Some embodiments of the method 1100 begin at stage 1104 by deploying the RF gateway to include several ground RF antennas spaced apart by a ground antenna spacing distance. The ground RF antennas are configured to communicate with the MIMO RF transceiver station via the LoS MIMO RF link. The deploying at stage 1104 can be prior to stage 1112 and/or prior to stage 1108. In some implementations, the same number of antennas (i.e., N) is used for both the HAPS RF antennas and the ground RF antennas. For example, the MIMO RF link is a 2×2 link, a 3×3 link, a 4×4 link, etc. In some implementations, the inter-antenna spacing is the same at both the RF gateway and at the MIMO RF transceiver station (i.e., the ground antenna spacing and the HAPS antenna spacing are the same).

Some embodiments of the method 1100 begin at stage 1101 (prior to deploying the HAPS at stage 1108) by determining inter-antenna spacings (i.e., the HAPS antenna spacing distance and the ground antenna spacing distance). Some embodiments determine a minimum spacing to achieve a maximum capacity according to Equation 38, above (e.g., with r=1). Such embodiments, at stage 1102, can build the MIMO RF transceiver station such that the HAPS RF antennas are spaced apart according to the determined HAPS antenna spacing.

Figures 12A, 12B:
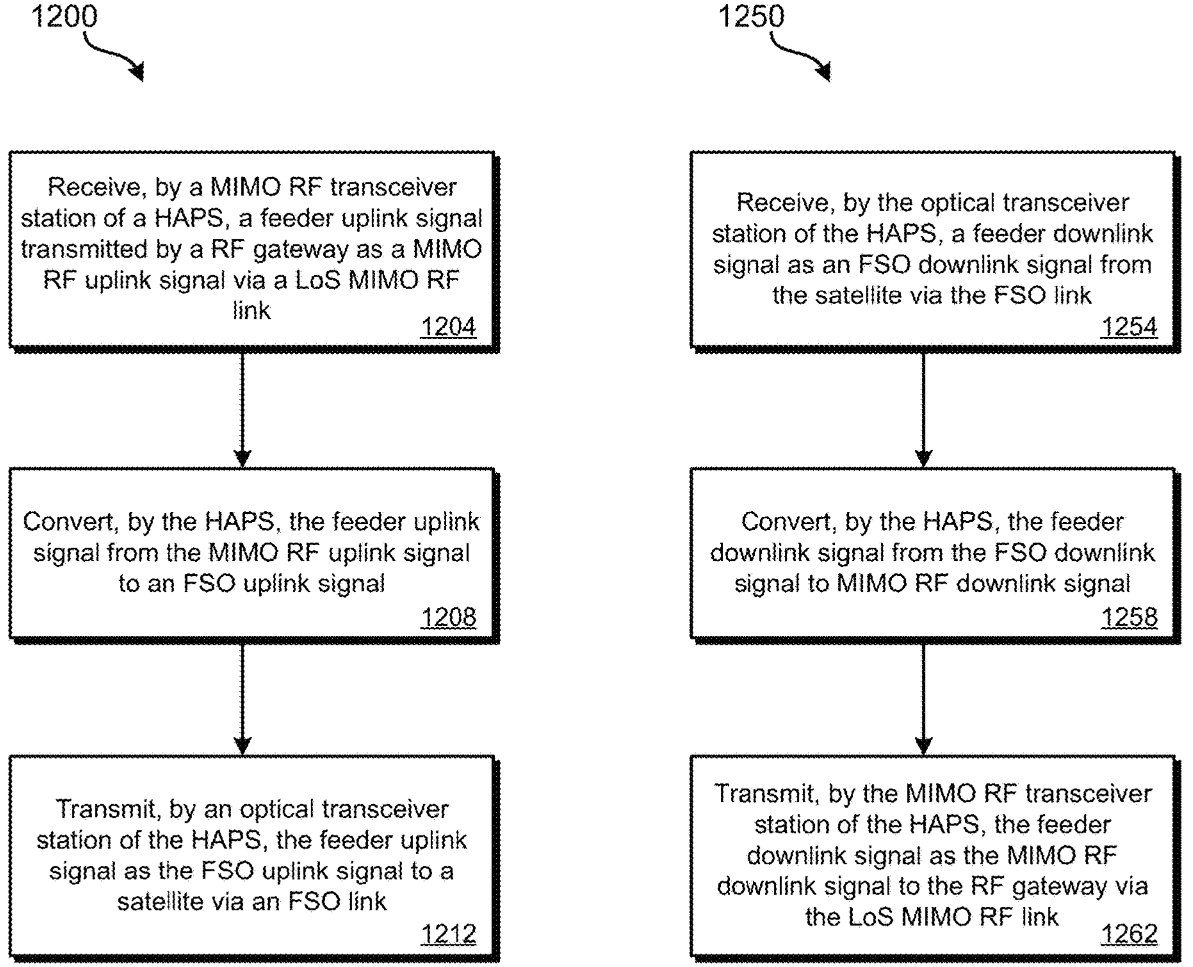
FIGS. 12A and 12B show flow diagrams of a method for providing ground-to-satellite communications via a HAPS, according to embodiments described herein.

FIGS. 12A and 12B show flow diagrams of a method for providing ground-to-satellite communications via a HAPS, according to embodiments described herein. FIG. 12A shows a method 1200 of feeder uplink communications, and FIG. 12B shows a method 1250 of feeder downlink communications. The methods of FIGS. 12A and 12B assume that the HAPS includes a MIMO RF transceiver station with a plurality of HAPS RF antennas spaced apart by a HAPS antenna spacing distance and configured to communicate with an RF gateway via a LoS MIMO RF link, and that the HAPS includes an optical transceiver station configured to establish a FSO link with a satellite.

The method 1200 of FIG. 12A begins at stage 1204 by receiving, by the MIMO RF transceiver station of the HAPS, a feeder uplink signal transmitted by the RF gateway as a MIMO RF uplink signal via the LoS MIMO RF link. At stage 1208, embodiments can convert (e.g., by the HAPS) the feeder uplink signal from the MIMO RF uplink signal to an FSO uplink signal. At stage 1212, embodiments can transmit, by the optical transceiver station of the HAPS, the feeder uplink signal as the FSO uplink signal to the satellite via the FSO link.

The method 1250 of FIG. 12B begins at stage 1254 by receiving, by the optical transceiver station of the HAPS, a feeder downlink signal as an FSO downlink signal from the satellite via the FSO link. At stage 1258, embodiments can convert (e.g., by the HAPS) the feeder downlink signal from the FSO downlink signal to the MIMO RF downlink signal. At stage 1262, embodiments can transmit, by the MIMO RF transceiver station of the HAPS, the feeder downlink signal as the MIMO RF downlink signal to the RF gateway via the LoS MIMO RF link.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A satellite communication system for providing ground-to-satellite communications, the communications system comprising:

a high-altitude platform station (HAPS) comprising:

a multiple-in-multiple-out (MIMO) radio frequency (RF) transceiver station comprising a plurality of HAPS RF antennas spaced apart by a HAPS antenna spacing distance that is determined based on an inter-antenna spacing distance of a plurality of RF gateway antennas and a distance between an RF gateway that includes the plurality of RF gateway antennas and the HAPS to maximize a capacity of a line-of-sight (LoS) MIMO RF link and configured to communicate with an RF gateway via the LoS MIMO RF link; and an optical transceiver station configured to establish a free-space optical (FSO) link with a satellite, wherein each of the LoS MIMO RF link and the FSO link is a respective sub-link of a hybrid RF/FSO communication link between the RF gateway and the satellite.

2. The satellite communication system of claim 1, further comprising:

the RF gateway comprising a plurality of ground RF antennas spaced apart by a ground antenna spacing distance and configured to communicate with the MIMO RF transceiver station via the LoS MIMO RF link.

3. The satellite communication system of claim 2, wherein the plurality of HAPS RF antennas is N antennas and the plurality of ground RF antennas is N antennas, wherein N is an integer greater than 1.

4. The satellite communication system of claim 2, wherein each of the plurality of ground RF antennas and the plurality of HAPS RF antennas is arranged as a uniform linear antenna array or a circular antenna array.

5. The satellite communication system of claim 3, wherein N>2.

6. The satellite communication system of claim 1, wherein the HAPS is configured to be deployed at a lower-stratospheric altitude above the Earth in a location having line of sight to the RF gateway.

7. The satellite communication system of claim 1, wherein the HAPS further comprises:

an RF-to-FSO bridge that couples the MIMO RF transceiver station with the optical transceiver station, wherein the MIMO RF transceiver station communicates over the LoS MIMO RF link in a first frequency band, the optical transceiver station communicates over the FSO link in a second frequency band different from the first frequency band, and the RF-to-FSO bridge bridges communications between the first frequency band and the second frequency band.

8. The satellite communication system of claim 7, wherein the first frequency band utilizes one or more of the Ka band, the Q band, the E band, or the V band.

9. The satellite communication system of claim 7, wherein the second frequency band utilizes one or more of the optical C band or the optical L band.

10. The satellite communication system of claim 7, wherein:

the MIMO RF transceiver station receives RF signals in the first frequency band via the LoS MIMO RF link and converts the RF signals to bridge-protocol signals;

the RF-to-FSO bridge communicates the bridge-protocol signals to the optical transceiver station; and the optical transceiver station converts the bridge-protocol signals to FSO signals in the second frequency band and communicates the FSO signals over the FSO link.

11. The satellite communication system of claim 7, wherein:

the MIMO RF transceiver station receives RF signals in the first frequency band via the LoS MIMO RF link;

the RF-to-FSO bridge converts the RF signals to FSO signals in the second frequency band and communicates the FSO signals to the optical transceiver station; and the optical transceiver station communicates the FSO signals over the FSO link.

12. A satellite communication system for providing ground-to-satellite communications, the communications system comprising:

a high-altitude platform station (HAPS) comprising:

a multiple-in-multiple-out (MIMO) radio frequency (RF) transceiver station comprising a plurality of HAPS RF antennas spaced apart by a HAPS antenna spacing distance and configured to communicate with an RF gateway via a line-of-sight (LoS) MIMO RF link; and an optical transceiver station configured to establish a free-space optical FSO) link with a satellite, wherein each of the LoS MIMO RF link and the FSO link is a respective sub-link of a hybrid RF/FSO communication link between the RF gateway and the satellite; and wherein the ground antenna spacing distance and the HAPS antenna spacing distance are the same.

13. A satellite communication system for providing ground-to-satellite communications, the communications system comprising:

a high-altitude platform station (HAPS) comprising:

a multiple-in-multiple-out (MIMO) radio frequency (RF) transceiver station comprising a plurality of HAPS RF antennas spaced apart by a HAPS antenna spacing distance and configured to communicate with an RF gateway via a line-of-sight (LoS) MIMO RF link; and an optical transceiver station configured to establish a free-space optical (FSO) link with a satellite, wherein each of the LoS MIMO RF link and the FSO link is a respective sub-link of a hybrid RF/FSO communication link between the RF gateway and the satellite; and wherein the HAPS antenna spacing distance ($d_{H,A}$) and a ground antenna spacing distance ($d_{G,A}$) are determined based on:

$$\left|\frac{2\pi}{\lambda}\left(D_{G,H} - \sqrt{D_{G,H}^2 + d_{H,A}^2}\right) - \frac{2\pi}{\lambda}\left(\sqrt{D_{G,H}^2 + d_{G,A}^2} - D_{G,H}\right)\right| = 3\pi,$$

where $D_{G,H}$ corresponds to a distance between the RF gateway and the HAPS, and $\lambda$ corresponds to a wavelength of a carrier frequency used for communications over the LoS MIMO RF link.

14. A method for providing ground-to-satellite communications, the method comprising:

deploying a high-altitude platform station (HAPS) comprising:

a multiple-in-multiple-out (MIMO) radio frequency (RF) transceiver station comprising a plurality of HAPS RF antennas spaced apart by a HAPS antenna spacing distance that is determined based on an inter-antenna spacing distance of a plurality of RF gateway antennas and a distance between an RF gateway that includes the plurality of RF gateway antennas and the HAPS to maximize a capacity of a line of sight (LoS) MIMO RF link and configured to communicate with an RF gateway via the LoS MIMO RF link; and an optical transceiver station configured to establish a free-space optical (FSO) link with a satellite, wherein each of the LoS MIMO RF link and the FSO link is a respective sub-link of a hybrid RF/LSO communication link between the RF gateway and the satellite; and establishing a relay-assisted ground-satellite communication link between the RF gateway and the satellite via the HAPS.

15. The method of claim 14, further comprising:

deploying the RF gateway prior to the establishing, the RF gateway comprising a plurality of ground RF antennas spaced apart by a ground antenna spacing distance and configured to communicate with the MIMO RF transceiver station via the LoS MIMO RF link.

16. The method of claim 15, wherein:

the plurality of HAPS RF antennas is N antennas and the plurality of ground RF antennas is N antennas, wherein N is an integer greater than 1.

17. The method of claim 14, further comprising, prior to deploying the HAPS:

determining the HAPS antenna spacing ($d_{H,A}$) and a ground antenna spacing distance ($d_{G,A}$) based on:

$$\left|\frac{2\pi}{\lambda}\left(D_{G,H} - \sqrt{D_{G,H}^2 + d_{H,A}^2}\right) - \frac{2\pi}{\lambda}\left(\sqrt{D_{G,H}^2 + d_{G,A}^2} - D_{G,H}\right)\right| = 3\pi,$$

where $D_{G,H}$ corresponds to a distance between the RF gateway and the HAPS, and $\lambda$ corresponds to a wavelength of a carrier frequency used for communications over the LoS MIMO RF link; and building the MIMO RF transceiver station such that the HAPS RF antennas are spaced apart according to the determined HAPS antenna spacing.

18. The method of claim 15, wherein deploying the HAPS comprises deploying the HAPS at a lower-stratospheric altitude above the Earth in a location having line of sight of to the RF gateway.

* * * * *